(12) United States Patent
Tierney et al.

(10) Patent No.: US 7,240,165 B2
(45) Date of Patent: Jul. 3, 2007

(54) SYSTEM AND METHOD FOR PROVIDING PARALLEL DATA REQUESTS

(75) Inventors: Gregory Edward Tierney, Chelmsford, MA (US); Simon C. Steely, Jr., Hudson, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 641 days.

(21) Appl. No.: 10/758,473

(22) Filed: Jan. 15, 2004

(65) Prior Publication Data

US 2005/0198187 A1 Sep. 8, 2005

(51) Int. Cl.
*G06F 12/00* (2006.01)
(52) U.S. Cl. .................. 711/144; 711/137; 711/145
(58) Field of Classification Search ............... None
See application file for complete search history.

(56) References Cited

U.S. PATENT DOCUMENTS

| | | | |
|---|---|---|---|
| 5,355,467 A | 10/1994 | MacWilliams et al. | |
| 5,802,577 A | 9/1998 | Bhat et al. | |
| 5,819,105 A | 10/1998 | Moriarty et al. | |
| 5,829,040 A | 10/1998 | Son | |
| 5,875,467 A | 2/1999 | Merchant | |
| 5,875,472 A | 2/1999 | Bauman et al. | |
| 5,958,019 A | 9/1999 | Hagersten et al. | |
| 6,052,760 A | 4/2000 | Bauman et al. | |
| 6,055,605 A | 4/2000 | Sharma et al. | |
| 6,081,887 A | 6/2000 | Steely, Jr. et al. | |
| 6,085,263 A | 7/2000 | Sharma et al. | |
| 6,108,737 A | 8/2000 | Sharma et al. | |
| 6,345,342 B1 | 2/2002 | Arimilli et al. | |
| 6,356,918 B1 | 3/2002 | Chuang et al. | |
| 6,408,363 B1 | 6/2002 | Lesartre et al. | |
| 6,457,100 B1 | 9/2002 | Ignatowski et al. | |
| 6,457,101 B1 | 9/2002 | Bauman et al. | |
| 6,490,661 B1 | 12/2002 | Keller et al. | |
| 6,523,138 B1* | 2/2003 | Natsume et al. ............... 714/43 |
| 6,546,465 B1 | 4/2003 | Bertone | |
| 6,587,921 B2 | 7/2003 | Chiu et al. | |
| 6,615,343 B1 | 9/2003 | Talcott et al. | |
| 6,631,401 B1 | 10/2003 | Keller et al. | |
| 6,633,960 B1 | 10/2003 | Kessler et al. | |
| 6,633,970 B1 | 10/2003 | Clift et al. | |
| 6,766,360 B1* | 7/2004 | Conway et al. ............. 709/214 |
| 6,961,827 B2* | 11/2005 | Shanahan et al. ........... 711/144 |

(Continued)

FOREIGN PATENT DOCUMENTS

EP    1 162 542    12/2001

OTHER PUBLICATIONS

Jim Handy, The Cahe Memory Book, , 1993; p. 153 line 29 to p. 154 line 24; p. 169.*

(Continued)

*Primary Examiner*—Reginald Bragdon
*Assistant Examiner*—Ngoc Dinh

(57) ABSTRACT

A multi-processor system includes a requesting node that provides a first request for data to a home node. The requesting node being operative to provide a second request for the data to at least one predicted node in parallel with first request. The requesting node receives at least one coherent copy of the data from at least one of the home node and the at least one predicted node.

33 Claims, 7 Drawing Sheets

U.S. PATENT DOCUMENTS

| | | |
|---|---|---|
| 2001/0034815 A1 | 10/2001 | Dungan et al. |
| 2002/0009095 A1 | 1/2002 | Van Doren et al. |
| 2002/0073071 A1 | 6/2002 | Pong et al. |
| 2002/0144063 A1 | 10/2002 | Peir et al. |
| 2003/0018739 A1 | 1/2003 | Cypher et al. |
| 2003/0140200 A1 | 7/2003 | Jamil et al. |
| 2003/0145136 A1 | 7/2003 | Tierney et al. |
| 2003/0195939 A1 | 10/2003 | Edirisooriya et al. |
| 2003/0200397 A1 | 10/2003 | McAllister et al. |

OTHER PUBLICATIONS

Martin, Milo M.K., et al., "Token Coheence: Decoupling Performance and Correctness", ISCA-30, pp. 1-12, Jun. 9-11, 2003.

Rajeev, Joshi, et al. "Checking Cache-Coherency Protocols with TLA+", Journal of Formal Methods in System Design. vol. 22, No. 2, Mar. 2003, pp. 125-131, Springer, Netherlands.

Acacio, Manuel E., et al. "Owner Prediction for Accelerating Cache-to-Cache Transfer Misses in cc-NUMA Multiprocessors." SC2002 High Performance Networking and Computing, pp. 49-60, Nov. 2002, IEEE Computer Society Press, Los Alamitos, CA.

Gharachorloo, Kourosh, et al., "Architecture and Design of Alpha Server GS320." ASPLOS-IX proceedings : Ninth International Conference on Architectural Support for Programming Languages and Operating Systems, Cambridge, Mass., Nov. 2000, vol. 35, No. 11.

Gharachorloo, Kourosh , et. al., "Memory consistency and event ordering in scalable shared-memory multiprocessors", Proceedings of the 17th annual international symposium on Computer Architecture, p. 15-26, Seattle, Washington, May 1990.

* cited by examiner

SYSTEM AND METHOD FOR PROVIDING PARALLEL DATA REQUESTS

RELATED APPLICATION

This application is related to the following commonly assigned co-pending patent applications entitled, "SYSTEM AND METHOD FOR UPDATING OWNER PREDICTORS," U.S. patent application Ser. No. 10/758,368, which is being filed contemporaneously herewith and is incorporated herein by reference.

BACKGROUND

Multi-processor systems employ two or more computer processors that can communicate with each other, such as over a bus or a general interconnect network. In such systems, each processor may have a memory cache (or cache store) that is separate from the main system memory. Each individual processor can directly access memory caches of other processors. Thus, cache memory connected to each processor of the computer system can often enable fast access to data. Caches can reduce latency associated with accessing data on cache hits and reduce the number of requests to system memory. In particular, a write-back cache enables a processor to write changes to data in the cache without simultaneously updating the contents of memory. Modified data can be written back to memory at a later time if necessary.

Coherency protocols have been developed to ensure that whenever a processor reads a memory location, the processor receives the correct or true data. Additionally, coherency protocols ensure that the system state remains deterministic by providing rules to enable only one processor to modify any part of the data at any one time. If proper coherency protocols are not implemented, however, inconsistent copies of data can be generated.

SUMMARY

One embodiment of the present invention may comprise a multi-processor system that includes a requesting node that provides a first request for data to a home node. The requesting node is operative to provide a second request for the data to at least one predicted node in parallel with first request. The requesting node receives at least one coherent copy of the data from at least one of the home node and the at least one predicted node.

Another embodiment of the present invention may comprise multi-processor network that includes a requesting processor that provides a first request for data to a home node. The home node comprises a directory that maintains directory state information associated with the data. The home node is operative to provide a second request to an owner processor in response to the first request if the directory state information indicates that the owner processor has a cached copy of the data. An owner predictor is associated with the requesting processor. The owner predictor is operative to identify at least one predicted node associated with the first request. The first processor provides a third request for the data to the least one predicted node substantially concurrently with the first request.

Still another embodiment of the present invention may comprise a method that includes issuing a first request for a block of data from a requester to a home node. A second request for the block of data is concurrently issued from a requester to a predicted node based on the first request. At least one coherent copy of the block of data is received at the requester from an owner node, if the owner node has an exclusive cached copy of the block of data, and from the home node, if no exclusive cached copy of the block of data exists when the home node receives the first request.

DETAILED DESCRIPTION

This disclosure relates generally to a protocol for a multi-processor system. The protocol can reduce latency associated with retrieving data from a remote cache. The protocol allows a first request to a home node that contains a directory in parallel with a second request sent to a predicted (or speculated) node. The protocol ensures that each copy of data returned to a requester is coherent. Accordingly, when cached data is retrieved from the predicted owner in response to the second request, the perceived latency of coherent memory requests can be reduced. Prediction is not required by the protocol, but can be executed opportunistically for a given transaction by a requester, as described herein.

Figure 1:
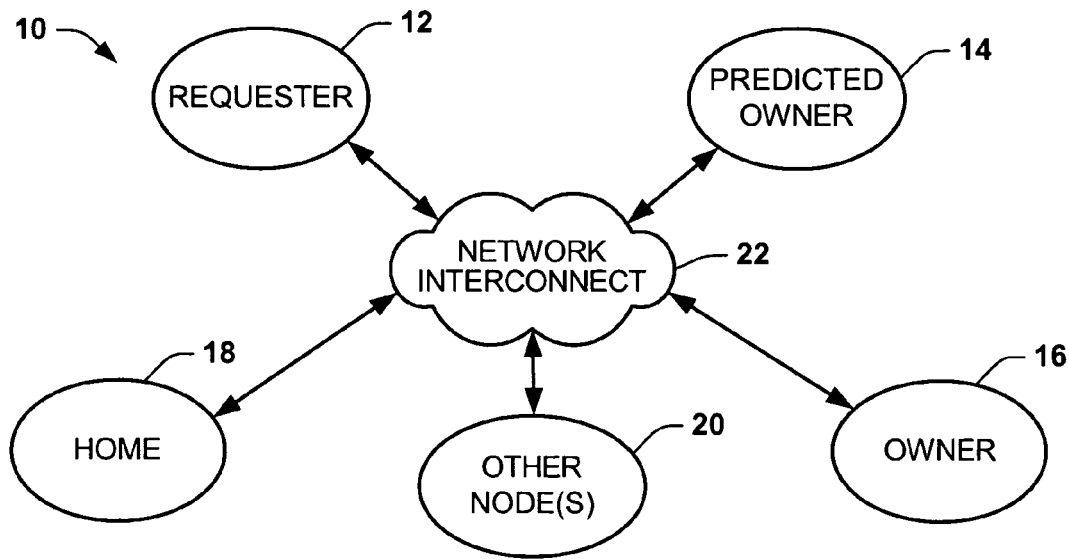
FIG. 1 depicts a schematic diagram of a multi-processor network.

FIG. 1 depicts an example of a multi-processor network 10 that includes a requester node 12, a predicted owner node 14, an owner node 16, a home node 18, and one or more other nodes 20. The network 10 also includes a network interconnect 22 that enables communication between the nodes 12, 14, 16, 18, and 20. For example, the network interconnect 18 can be implemented as a switch fabric or a hierarchical switch. The other nodes 20 can correspond to one or more additional processors or other multi-processor systems (e.g., one or more symmetric multi-processor (SMP) nodes) connected to the network interconnect 22, such as through an appropriate interconnect interface (not shown).

The nomenclature for the nodes 12, 14, 16, 18 and 20 in FIG. 1 is generally descriptive of the nodes relationship to a given line of data. As used herein, a node that issues a request, such as a victim, read, or write request, defines a source node or the requester 12. Other nodes within the network 10 are potential targets (or target nodes) of the request, such as nodes 14, 16 and/or 20. Additionally, each memory block in the network 10 can be assigned a home node that maintains necessary global information and a data value for that memory block, such as node 18. A memory block can occupy part of a cache line, an entire cache line, or span across multiple cache lines. For purposes of simplicity of explanation, however, this disclosure assumes that a "memory block" occupies a single "cache line" in a cache or a single "memory line" in a memory, such as at the home node.

The network 10 implements a directory-based cache coherency protocol to manage the sharing of data to ensure coherence of the data. Generally, the protocol establishes rules for transitioning between states, such as when data is read from or written to home 18 as well as the other nodes 12, 14, 16, or 22.

For example, the network 10 can employ a directory-based protocol in which directory state information can be maintained at the home node 18. When the requester node 12 requires a copy of a memory block, the requester issues a request to the home node 18. The home node 18 includes resources (e.g., a directory in-flight table (DIFT)) to manage the requests for the associated data, including the request from the requester as well as from other possible requesters in the network 10. The home node also employs a directory to ascertain where in the network 10 a coherent copy of the requested data may be located for a given memory block.

The protocol ensures that any data returned to the requester 12 is coherent. The network 10 thus can utilize the protocol to reduce the perceived latency for obtaining a block of data. In an effort to reduce latency, the protocol enables the requester 12 to provide more than one request to selected nodes in the network 10. For example, the requester 12 can provide a first request to the home node 18 and a second request to the predicted owner 14 in parallel with the first request via the interconnect 22. The first request can be provided to the home node 18 on a request channel and the second request can be provided to the predicted owner 14 on a forward channel. Thus, the first and second requests can be substantially concurrent requests provided via the interconnect 22 for the same line of data.

For example, the requester 12 can employ an owner predictor (not shown) to provide the second (e.g. speculative) for requesting data from one or more other nodes identified by the owner predictor as predicted owner(s) of across the network interconnect 22. Alternatively, the requester 12 can determine one or more predicted nodes that vary based on each request and provide the second request based on the predicted owner node(s).

In response to the first request, the home node 18 employs a directory to determine whether an exclusive cached copy of the requested data exists in the network 10. Assuming that such a cached copy of the data exists, the home node 18 allocates an entry in a corresponding DIFT. The home node 18 employs the DIFT entry to serialize requests provided to the home node for the same block of data. The home node 18 then sends a request to the owner node 16 for the data via the network interconnect 22 over a virtual forward channel. The owner node 16 receives the forward request from the home node 18 and provides a corresponding response to the requester 12 over a virtual response channel of the network interconnect 22, which response may include a copy of the requested data. An update may also be provided to the home node 18 when the owner node 16 responds with data. The request transaction employing a request channel, forward channel and response channel corresponds to a typical three-hop transaction of a block of data. Those skilled in the art will appreciate that the protocol can be free of deadlocks because the protocol employs three message channels (or classes), namely, requests, forwards, and responses. The protocol further requires that the progress of a higher channel not be impeded by a blockage in a lower channel. In this example, it is assumed that the response channel is higher than both the forward channel and the request channel and that the forward channel is higher than the request channel.

In a situation when the predicted owner 14 is the owner node 16, the protocol establishes a race condition between the requester 12 and the home node 18 in which the first request to reach the owner will return a coherent copy of the requested data. Since the protocol ensures that any copy of data returned is coherent, the requester 12 can consume the first copy of data returned even in situations when more than one copy of data is returned. When the second request (the speculative request) arrives at the owner first, the data can be retrieved using two virtual channels, such as the forward channel and the response channel. A request transaction employing only the forward channel and response channel corresponds to a two-hop transaction that can often retrieve the block of data with reduced latency relative to the three-hop transaction mentioned above.

A speculative forward request to the predicted node 14 is not required to hit a valid target. If the predicted node 14 is not the owner node 16, the second request results in a miss and the coherent copy of the requested data will be returned using the three-hop approach mentioned above in response to the first request. The protocol further provides general maintenance procedures to manage and track the second request and responses to the request. The maintenance procedures, for example, can involve the predicted owner 14 notifying the home node 18 when the predicted owner provides a data response (e.g., at a cache hit) to the second request. When the predicted owner 14 does not include an exclusive cached copy of the data, the predicted owner responds to the forward request from the requester 12 with a miss response.

Figure 2:
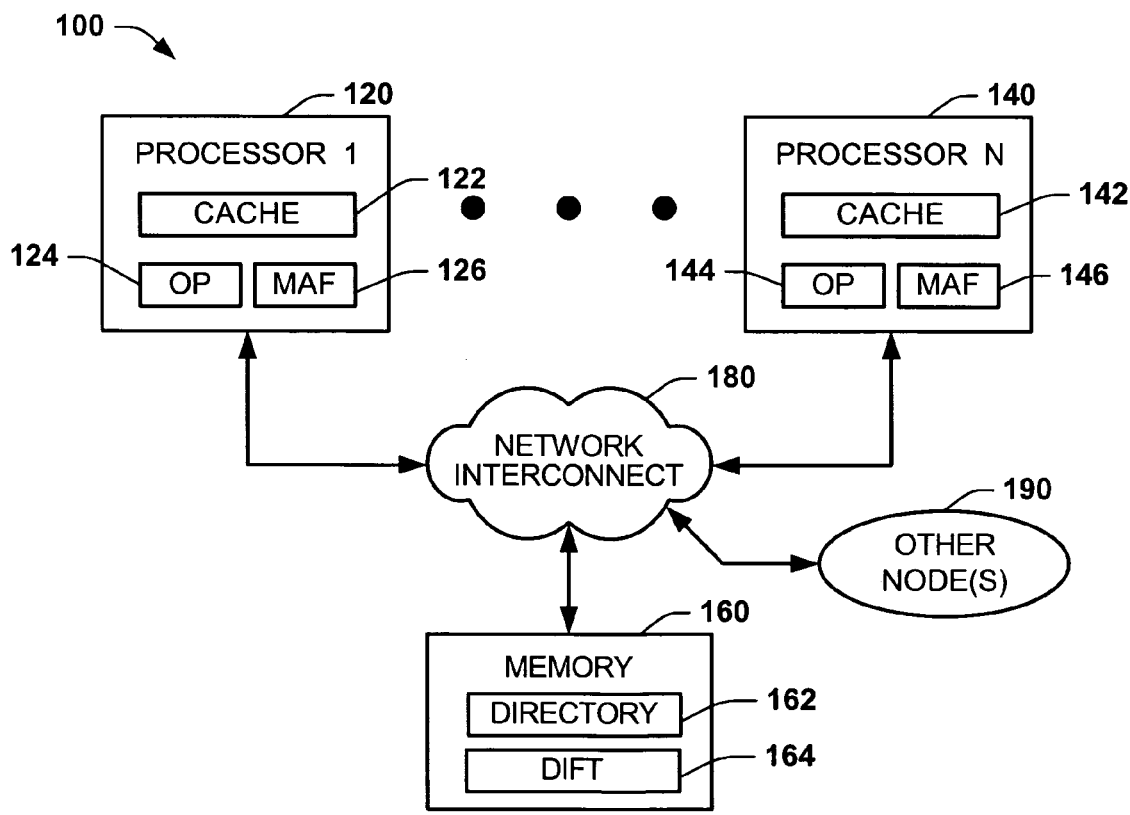
FIG. 2 depicts an example of another multi-processor network.

FIG. 2 depicts an example of another multi-processor network 100 that includes a plurality of processors 120 and 140 (indicated at PROCESSOR 1 through PROCESSOR N, where N is a positive integer greater than 1). The network 100 also includes memory 160, which can be implemented as a globally accessible shared memory. For example, the memory 160 can include one or more memory storage devices (e.g., dynamic random access memory (DRAM)). Those skilled in the art will understand and appreciate various memory configurations and implementations that can be utilized in the network 100.

The processors 120, 140 and memory 160 define nodes in the network 100 that can communicate with each other via a network interconnect 180. For example, the network interconnect 180 can be implemented as a switch fabric or a hierarchical switch. Also, associated with the network 100 can be one or more other nodes, indicated schematically at 190. The other nodes 190 can correspond to one or more additional processors or other multi-processor systems (e.g., one or more symmetric multi-processor (SMP) nodes) connected to the network interconnect 180, such as through an appropriate interconnect interface (not shown).

Each of the processors 120 and 140 includes at least one corresponding cache 122 and 142. For purposes of clarity, each of the respective caches 122 and 142 are depicted as unitary memory structures, although they may include a plurality of memory devices or different cache levels. Each of the caches 122 and 142 can include a plurality of cache lines. Each cache line has an associated tag address that identifies corresponding data stored in the line.

An owner predictor 124, 144 can be associated with each respective processor 120, 140. The owner predictors 124 and 144 may be of any suitable configuration to identify a predicted target node based on a request provided by the respective processor 120 and 140. The predicted owner can be the same for all requests issued by the requester. For example, an owner predictor can be implemented as controller or look-up table employed by a processor to identify one or more speculated targets to which a processor can send a request for data. The particular algorithm implemented by an owner predictor can be as simple as identifying the same one or more speculated targets for every data request. Alternatively, the algorithm can determine one or more speculated targets by employing statistical inferencing, or heuristics, for example. The processors 120 and 140 thus can employ the owner predictors 124 and 144, respectively, to send requests to the one more speculated targets in parallel with a request to a home node at the memory 160.

Additionally or alternatively, the protocol can employ a command-type taxonomy to distinguish between a first subset of commands issued in connection with owner prediction (or speculation) and a second subset of commands issued without employing owner prediction. Accordingly, a given processor 120, 140 can selectively issue either a non-speculative or a speculative type of request for a given line of data. The owner predictor 124, 144 can operate to identify one or more speculative target processors only when a request is issued with speculation.

Each cache 122, 142 can include a plurality of cache lines, each cache line including information that identifies the state of the data stored in the respective cache. A given memory block can be stored in a cache line of one or more of the caches 122, 142 as well as in a memory line of the memory 160, depending on the state of the line. Whether a cache line contains a coherent copy of the data depends on the state of the cache line. A selected subset of these states can further require that the data be written back to the memory 160 upon displacement, since the data may be more up-to-date than memory. For example, the network 100 can employ a "MESI" cache coherency protocol having the states for cached data in the network, as identified in Table 1.

TABLE 1

| STATE | DESCRIPTION |
|---|---|
| I | Invalid - The cache line does not exist. |
| S | Shared - The cache line is valid and unmodified by caching processor. Other processors may have valid copies, and the caching processor cannot respond to snoops by returning data. |
| E | Exclusive - The cache line is valid and unmodified by caching processor. The caching processor has the only cached copy in the system. The caching processor responds to forward requests by returning data and issues a downgrade message to memory upon displacement. |
| M | Modified - The cache line is valid and has been modified by the caching processor. The caching processor has the only cached copy in the system. The caching processor responds to forward requests by returning data and writes data back to memory upon displacement. |

Each processor 120, 140 also includes an associated miss address file (MAF) 124, 146. The MAF includes MAF entries associated with each pending transaction at a respective processor. The MAF entry includes fields that identify, for example, the address of the data being requested, the type of request (e.g., a normal command or a command involving prediction), and response information (e.g., including data, forwarding, and acknowledgements) received from other nodes in response to the request. An example of fields that can be implemented in a MAF entry is provided below in Table 2. As used in the commands of Table 2 and commands contained in other tables herein, an asterisk symbol "*" denotes a wildcard. The wildcard can represent any one of plural different command terms used in place of the wildcard, such that the command containing the wildcard may correspond to other command types identified herein.

TABLE 2

| Field | Initial Value | Description |
|---|---|---|
| ReqType | Per request type | Encode request type. |
| DataResp | FALSE | Set TRUE by first data response (or by upgrade response). |
| HomeResp | FALSE | Set TRUE by non-speculative response. |
| SpecCnt | # | Initialize with the number of speculative forwards sent with transaction. Field can be zero for non-speculative requests. |
| SpecResp. | 0 | Number of speculative responses incremented by each speculative response (BlkSpec* or SpecMiss). |
| FillState | wait4resp | Determines state to fill cache; once coherent, mirrors cache state. |
| VicState | Idle | Use to resolve forward miss cases. |
| InvalCnt | 0 | Set by BlkExclCnt (See Table 6) with number of invalidates sent from directory. |
| InvalResp | 0 | Incremented by each Inval acknowledgment. |
| InvalPtr | 0 | A pointer to the source of a blocked Inval, plus a valid bit to indicate that the InvalAck is being withheld. May also need to include a transaction I.D. for use with the InvalAck. |
| Address | Per request | Record address of memory block. |
| Coherent | FALSE | Derived from above states: = Coherent, (DataResp & InvalCnt == InvalResp) |
| Complete | N/A | Derived from above states: = DataResp & HomeResp & InvalCnt = InvalResp & SpecCnt = SpecResp. |

In the directory-based protocol of the system, the memory 160 can operate as the home node and include a directory 162. The memory 160 employs the directory 162 to ascertain where in the network 100 a coherent copy of the requested data should be located for each memory block. The directory 162 also includes directory state information that maintains a listing of nodes in the network 100 that include coherent copies of data and the particular state associated with the data (e.g., M, E or S-states). A directory in-flight table (DIFT) 164 can exist for a selected subset of memory lines at the memory 160. A directory controller at the home node employs the DIFT to manage and process transactions that have been forwarded to an exclusive cache copy (e.g., at an owner node). The DIFT 164 can be utilized to change the state of a given block of data in the directory 162 based on forward responses provided by other nodes in the network 100. The DIFT 164 also is operative to order requests at the home node when more than one concurrent request exists to the same line of data. Since the DIFT serializes home requests to the same block, the number of non-speculative forward messages is limited to no more than one per target for a given block of data.

A new entry can be allocated in the DIFT 164 if the directory state determines that a single exclusive copy of the requested block is cached remotely at an owner node (e.g., at the processor 140 in the M or E-state). The entry is established in the DIFT 164 before a forward command is sent. For the example of a non-speculative request, the owner node will return a response to the requester in parallel with a message to the home node at the memory 160 that may contain modified data in response to the forward request. A directory controller can update the directory state information associated with the block of data in the directory 162 based on the response and the DIFT entry can be retired.

In another subset of non-speculative cases, the DIFT entry can intercept a victim message provided in the response channel to the same data as a pending DIFT entry. The victim can be paired with a FwdMiss response from the owner node, indicating that the targeted cache did not have ownership of the line when the forward was received from the home node. In an unordered network, such as the network 100, it is possible either the victim or the FwdMiss to arrive at the DIFT entry first. Typically, after both the victim and FwdMiss have arrived at the DIFT entry, the memory 160 will have a coherent copy of the data, and can in turn provide the appropriate response to complete the request. The directory state can then be updated and the DIFT entry retired.

As described herein, the protocol implemented by the network 100 also affords a requesting processor the opportunity to issue requests with speculation. A request issued with speculation to the home node thus can also include a parallel speculative forward request to one or more predicted owners. When a speculative request is issued in parallel with a speculative forward request that results in a cache hit, the owner node having an exclusive cached copy sends a victim command in the response channel back the home node in parallel with the data response to the requester. However, instead of transferring ownership back to the home node, as in the non-speculative case noted above, the speculative response indicates that a new cached copy (e.g., either shared or exclusive) exists at the requester. Thus, when both the speculative victim response and the FwdMiss have arrived at the DIFT, the directory controller checks whether (i) the new cached copy matches the source of the request or (ii) the new cached copy is for a different cache.

In a typical speculative case, there is a high likelihood that the source of the DIFT transaction will match the target of the speculative response, and the controller can update the directory state and retire the DIFT entry. In a less common scenario, the DIFT entry will have to be reset and a new forward request sent to a different target node. This latter scenario turns a typical three-hop request into a five-hop (e.g., increased latency) request. Those skilled in the art will appreciate, however, that the MAF controller employs rules that prevent another speculative forward request from acquiring a cached copy of data while the MAF entry is pending. As a result, the latter scenario should not result in greater than five hops to complete.

There is one other race condition that is resolved by the DIFT. It is possible that a victim from the requester can issue and arrive at the DIFT before the response from the owner target node. In this case, memory is updated with any new data value, and the DIFT state marked to prevent the response from updating memory with stale data. The directory state is written to reflect the victim, once all responses have been collected. Table 3 below depicts examples of fields that can be utilized to implement entries in the DIFT 164.

TABLE 3

| Field | Description |
|---|---|
| ReqType | Encode the type of transaction. |
| SourceID | Set to source (requester) when entry allocated. |
| TargetID | Initialize to identify owner processor specified by the directory. |
| NewTargetID | Set by a speculative victim response while DIFT entry is pending. |
| TgtVicState | Used to resolve target victim race cases. Initially set to Wait4Resp if SourceID = TargetID, or to VicPending otherwise. |
| SrcVicState | Used to resolve a race with a victim from the source. |
| TxnID | A transacting identifier for responses to the source (typically an index to the MAF entry). |
| Address | Implement with content addressable memory (CAM) to intercept commands to same block. |

The network 100 employs the protocol to manage the sharing of memory blocks so as to ensure coherence of data. Generally, the protocol can establish rules for transitioning between states, such as if data is read from or written to memory 160 or one of the caches 122 and 142. The network 100 can utilize the protocol to reduce the perceived latency of a request for a block of data.

By way of further example, a requester (processor 120) employs speculation to request a line of data not contained locally in the cache 122. Because the request includes speculation, the processor 120 employs the owner predictor 124 to identify one or more predicted owner processors. The processor 120 creates a corresponding entry in the MAF 126 associated with the speculative request, which can also identify the one or more predicted owners (See, e.g., Table 2).

The processor 120 provides two parallel requests across the network interconnect 180. The requester sends a first of the parallel requests (e.g., on a virtual request channel) to a home node located at the memory 160. The home node 160 employs the directory to ascertain (based on the state information in the directory 162) whether an exclusive cached copy exists in the network 100 (in the M or E-state). Assuming that an exclusive cached copy exists, the home node allocates an entry in the DIFT 164 (See, e.g., Table 3). The memory 160 sends a request (e.g., on a virtual forward channel) to the owner of the data (e.g., residing in one of the other nodes 190) via the network interconnect 180. The owner 190 sends the block of data to the requester 120 (e.g., over a virtual response channel) via the network interconnect 180. This corresponds to a typical three-hop transaction for a block of data.

The requester 120 sends the second parallel request directly (e.g., on a virtual forward channel) to a predicted owner (e.g., processor 140) via the network interconnect 180. For instance, the owner predictor 124 of the requester 120 can identify one or more predicted owners for the data required by the requester. The predicted owner can be same or different for each request and further can vary as a function of the request. Those skilled in the art will appreciate various algorithms that can be utilized to determine one or more predicted owners for each given speculative request.

The predicted owner (processor 140) can provide a response to the second request that includes the block of data across of the network interconnect 180 if the predicted owner 140 is owner of the block of data. The owner prediction provides a 2-hop path (e.g., employing the forward and response channel) that potentially reduces the latency associated with retrieving the data. Additionally, when the prediction (by the owner predictor) results in a hit at the predicted node, the predicted node can provide an update message to update the directory 162 in the memory 160. Depending on the timing of the acknowledgment message, the home node can either disregard the acknowledgement and request the data from the owner or it can respond to the first request directly via the network interconnect (e.g., employing the virtual response channel).

If the predicted owner 140 is not the owner node 190, however, the second request fails resulting in the predicted node providing a corresponding MISS response to the requester. If the second request fails, the first request will result in the requested data being returned to the requester in a three-hop path (e.g., employing the request, forward and response channels).

The system 100 thus typically does not produce a longer latency than the typical 3-hop path associated with the first request. The protocol helps ensure that any data returned to the requester is coherent. Accordingly, the requester can utilize the first copy of the requested data returned even though additional responses may be pending.

Figure 3:
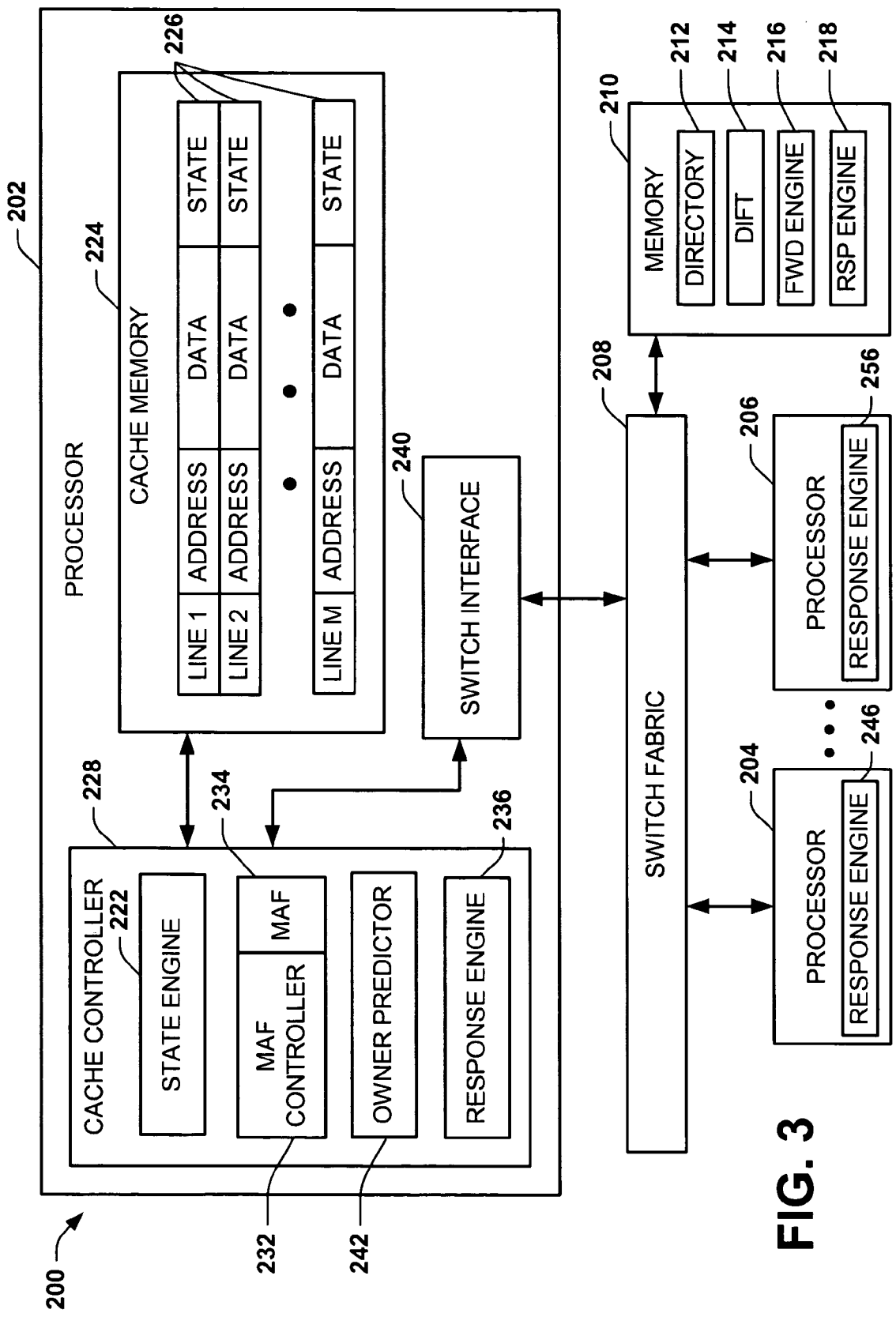
FIG. 3 depicts an example of a processor and memory within a multi-processor network.

FIG. 3 depicts an example of still another multi-processor network 200 that can implement a protocol employing owner prediction. The network 200 includes a plurality of processors 202, 204 and 206 in communication with each other via a switch fabric 208. There can be any number of two or more processors in the network 200. The network 200, for example, can be implemented as an integrated circuit or as circuitry (e.g., one or more circuit boards) containing plural integrated circuits. For instance, the plurality of processors can be arranged as a grid-like architecture, with each processor being coupled to one or more other processors through crossbar interconnections (not shown). For purposes of the following discussion, the processor 202 will be described with the understanding that the other processors 204 and 206 can be similarly configured.

The network 200 also includes associated memory 210, which can be organized as a single address space that is shared by the processors 202-206. The memory 210 employs a directory 212 to ascertain the home of requested data. The memory 210 can be implemented in a variety of known or proprietary configurations for storing selected data information for the respective processors 202-206 (e.g., at respective home nodes). The memory also includes a DIFT (or other similar mechanism) 214 to manage and process transactions. A directory controller (not shown) can employ the DIFT 214 to change the state of a given block of data in the directory 212 based on forward responses provided by other nodes in the network 200. The DIFT 214 is also operative to order requests at the home node when more than one concurrent request exists to the same line of data. The memory 210 employs a forward engine 216 to provide one or more requests (or other messages) to the network in a forward channel and a response engine to provide responses (or other messages) in a response channel.

The processor 202 includes cache memory 224 that contains a plurality of cache lines 226 (e.g., lines 1 through M, where M is a positive integer greater than or equal to 1). Each cache line 226 can contain data that includes one or more memory blocks. An address can be associated with the data contained in each cache line 226. Additionally, each cache line 226 can contain state information identifying the state of the data contained at that cache line (See, e.g., Table 1).

A cache controller 228 is associated with the cache memory 224. The cache controller 228 controls and manages access to the cache memory 224, including requests for data, forwarding data to other nodes, and responses to requests from other nodes. The cache controller 228 communicates requests, forwards, and responses to the network 200 via a switch interface 240 that is coupled with the switch fabric 208. The switch interface 240, for example, includes an arrangement of queues (e.g., input and output queues) or other data structures that organize requests, forwards, and responses issued by the processor 202, as well as requests, forwards, and responses for execution by the processor.

In the example of FIG. 3, the cache controller 228 includes a state engine 230 that controls the state of each respective line 226 in the cache memory 224. The state engine 230 is programmed and/or configured to implement state transitions for the cache lines 226 based on predefined rules established by the system implemented in the network 200. For example, the state engine 230 can modify the state of a given cache line 226 based on requests issued by the processor 202. Additionally, the state engine 230 can modify the state of a given cache line 226 based on responses, forwards, or requests associated with the address of the given cache line. The responses, forwards, or requests can be provided, for example, by another processor 204, 206 and/or the memory 210.

The cache controller 228 also includes a miss address file (MAF) controller 232 and a MAF 234 employed by the MAF controller. The MAF 234 can be implemented as a table, an array, a linked list, or other data structure programmed to manage and track requests for each cache line 226. The MAF 234 contains entries for outstanding requests associated with a selected subset of the cache lines 226 of the cache memory 224 (See, e.g., Table 2). The MAF controller 232 employs the MAF 234 to manage requests issued by the processor 202, as well as responses or forwards as a result of such requests. For instance, a MAF entry collects network responses from other cache controllers and from main memory, maintains state and other information for the pending transaction, and interfaces with the cache controller when the request is coherent. For example, when the processor 202 implements a transaction or request associated with a given address line, the MAF controller 232 allocates a corresponding entry for the transaction in the MAF 234. The type of transaction can involve speculation or prediction.

A MAF entry in the MAF 234 can receive multiple data responses, with the performance being enhanced by the ability to consume the first of these responses. Thus, the system 200 implements the MAF controller 232 with two "pending" states: one that stipulates that a transaction is coherent, and another that stipulates that a transaction is complete. When the transaction is issued with speculation, the first data received can be consumed by the processor 202 since the protocol ensures that only coherent data is returned.

An example set of rules implemented for a MAF entry in the MAF 234 can be as follows:

1. As long as a MAF entry in the MAF 234 is not coherent, any requests to the same tag address are blocked from reading or writing the cached line 226.
2. As long as a MAF entry is not complete and not coherent, any requests to the same line in the cache (even if a different tag) are precluded from allocating a new MAF entry in the MAF 234. This rule may be relaxed by employing a tight coupling between the MAF entry and the architecture of the cache memory 224.
3. If all entries in the MAF 234 are not complete or not coherent, all requests to the cache are blocked. This rule can be relaxed by utilizing an alternative flow control apparatus so that hits to the cache memory 224 can proceed.

The processor 202 also includes an owner predictor 242 that can be utilized for transactions that the MAF controller 232 issues with speculation. The determination whether to issue a request with speculation can be made, for example, by the operating system and/or by the cache controller 228 when a given block of data is required by the processor 202. The owner predictor 242 provides an identifier (e.g., a processor ID) for each predicted node in the system to which a respective speculative forward request is to be provided. The MAF controller 232 thus can employ the identifier to send a speculative request(s) in the forward channel in parallel with a corresponding request issued with speculation in the request channel. The processor 202 sends such requests via the switch interface 240 and the switch fabric 208 to the predicted target nodes and to the home node. For example, when the MAF controller 232 detects a request for a line of data includes speculation, a corresponding interprocessor message can be provided to the owner predictor 242. The owner predictor 242 returns the identifier (e.g., including a tag address and processor identification information) for each predicted node to which the speculative request(s) are to be provided. The MAF controller 232 sets appropriate values in the MAF entry fields (e.g., SpecCnt) and then sends the request (in the request channel) to the home node in parallel with the corresponding speculative command to one or more predicted owners (in the forward channel).

Table 4 lists examples of commands that can be implemented in a request channel of the system 200. These commands include transactions that involve issuing parallel associated forward channel commands to a predicted owner as well as transactions that do not involve parallel commands to a predicted owner. All the example commands in the request channel are sourced from the cache controller 228 (e.g., or other a caching agent) and target a directory controller at the home memory 210. The request channel can block in the event of conflicts or resource unavailability for a given transaction.

TABLE 4

| Command Name | Speculative | Description |
| --- | --- | --- |
| Read | No | A load request for data to be returned in either a shared or exclusive state when there is local cache miss. |
| RdWSpec | Yes | Sent concurrently with speculative forwards (FwdReadSpec). |
| RdShd | No | Same as Read except that the block ends up in a shared state. |
| RdShdWSpec | Yes | Sent concurrently with speculative forwards (FwdRdShdSpec). |
| RdMod | No | A store miss request for data to be returned in exclusive state. |
| RdModWSpec | Yes | Sent concurrently with speculative forwards (FwdRdModSpec). |
| Fetch | No | An uncached load request. |
| FetchWSpec | Yes | Sent concurrently with speculative forwards (FwdFetchSpec). |
| SharedtoDirty | No | A request to upgrade a shared copy to exclusive. |
| InvaltoDirty | No | A request to acquire an exclusive copy without a data response. |

The MAF controller 232 sends speculative forward commands to one or more targets, as identified by the owner predictor 242. Non-speculative forwards are sent from the directory controller of the memory 210 (home node) after it has been determined from a directory 212 look-up that there should be a cached copy of the requested data in the network 200. The directory 212 includes information that the directory controller can utilize to determine whether there is an exclusive owner of a cached block of data. The memory 216 employs a forward engine (e.g., associated with the directory controller) 216 that sends speculative forward commands from the memory 210 to the exclusive owner via the switch fabric 208. The forward engine 216 can send a FwdRead, FwdRdShd, FwdRdMod, FwdFetch, or FwdInvaltoDirty command, as appropriate, to the exclusive owner (See, e.g., Table 5 below) in response to receiving a corresponding command in the request channel.

If there are no exclusive copies, there may be a list of caches that hold a shared copy of the block. This list also is recorded in the directory 212. Since the protocol does not require displacement from the cache of a line in the shared state to be communicated to the home node, the list of sharers maintained by the directory 212 may not be current. Also, for scaling the network 200 to a large number of caching agents, the directory 212 can abbreviate the sharer list to cover a superset of agents, only some of which may actually cache the block of data.

An invalid (Inval) command is a forward command sourced from the home node to invalidate shared copies. Since Inval commands are sourced from the home node, Inval commands are non-speculative commands. The target of the Inval command, however, may be a MAF with speculative responses pending or a MAF with no speculative responses pending. In the case that there are no speculative responses are pending, when an Inval arrives at a node with a pending MAF, the Inval changes state and returns an acknowledgement message (InvalAck) to the source of the request.

If the target of an Inval command has responses to speculated forwards pending, then the InvalAck is withheld. A pointer and state information can be updated in a corresponding entry of the MAF 234 to identify the source of the Inval command. After all speculative responses have been received by the MAF entry, the MAF controller 232 can apply the Inval and send the InvalAck to the source processor. By deferring the InvalAck response, some race conditions can be prevented, such as a race with another processor's non-speculative request. Only one generation of Inval commands should be pending in the network 200 at a given time.

As mentioned above, the processor 202 (as a requester) can send speculative commands in the forward channel to one or more predicted nodes, as identified by the owner predictor 242. Speculative forward commands can be provided when the MAF controller 232 is instructed to issue a command with speculation in the request channel. As listed below in Table 5, the owner predictor 242 can enable a requester to source the following commands: FwdRdSpec, FwdRdShdSpec, FwdRdModSpec, and FwdFetchSpec.

TABLE 5

| Command Name | Source | Description |
| --- | --- | --- |
| FwdRead | Directory | Sent from the directory controller to a caching agent that is identified as the exclusive owner of the block specified by a Read. The target may choose to migrate ownership to the requester, or keep a shared copy. |

TABLE 5-continued

| Command Name | Source | Description |
| --- | --- | --- |
| FwdRdSpec | Source Processor | Sent directly from the source to one or more targets in search of an exclusive owner of the block. A RdWSpec is issued concurrently to the forward engine. |
| FwdRdShd | Directory | Sent from the forward engine to a caching agent that is identified as the exclusive owner of the block specified by a RdShd. The target may keep a shared copy. |
| FwdRdShdSpec | Source Processor | Sent directly from the source to one or more targets in search of an exclusive owner of the block. A RdShdWSpec is issued concurrently to the forward engine. |
| FwdRdMod | Directory | Sent from the forward engine to a caching agent that is identified as the exclusive owner of the block specified by a RdMod command. The target invalidates its copy. |
| FwdRdModSpec | Source Processor | Sent directly from the source to one or more targets in search of an exclusive owner of the block. A RdModWSpec is issued concurrently to the forward engine. |
| FwdFetch | Directory | Sent from the forward engine to a caching agent that is identified as the exclusive owner of the block specified by a Fetch. The target may keep its copy without changing its state. |
| FwdFetchSpec | Source Processor | Sent directly form the source to one or more targets in search of an exclusive owner of the block. A FetchWSpec is issued concurrently to the forward engine. |
| Inval | Directory | Sent from the forward engine to all caching agents that are listed with shared copies. Each target invalidates its copy. |
| FwdInvaltoDirty | Directory | Sent from the forward engine to a caching agent that is identified as the exclusive owner of the block specified by an InvaltoDirty. The target invalidates its copy. |

Messages in the forward channel (e.g., provided either by the forward engine 216 at the home node or by the owner predictor 242) do not block. The speculative forward command provided by the owner predictor 242 will thus return a data response to the requester (e.g., the processor 202) if the command successfully targets an exclusive copy. Non-speculative forward commands also result in a data response being provided to the requester in the desirable case that the target processor has the exclusive cached copy of the requested data. When a speculative forward command is sent to a processor that does not contain an exclusive copy of the requested data, a non-data SpecMiss response is returned to the requesting processor. In the event that the target processor no longer caches the exclusive copy of the requested data (or has a MAF entry pending for the requested data), a non-data FwdMiss response is returned to the home node (e.g., to the directory controller). In response to the FwdMiss, the DIFT 214 will block until a victim command from the target processor arrives at the home node (e.g., the directory controller). This victim command releases a blocked DIFT 214. The data is then forwarded from the home to the source of the DIFT and the request queue can once again progress.

Since the switch fabric 208 is an unordered network, it is unknown whether a forward request is intended for the pending data (e.g., a MAF request has been to the home) or for a previous, victimized, version of the data (e.g., MAF request may be blocked from allocating a DIFT entry). The resolution to any condition in which a non-speculative forward command sees a pending MAF is to change some state in the MAF and return FwdMiss to the home. When the data does arrive, the data is consumed by the cache and then is flushed out with a corresponding victim command. This victim command releases a blocked DIFT. The data is then forwarded from the home node to the source processor associated with the DIFT and the request queue can once again progress.

The response engine 236 controls responses provided by the processor 202. The processor 202 provides responses to forward channel commands received via the switch interface 240 from the memory 210 as well as from one or more other processors 204 and 206. The response engine 236, upon receiving a request from the network 200, cooperates with the state engine 230 and the MAF 234 to provide a corresponding response based on the type of request and the state of data contained in the cache memory 224. The processors 204 and 206 also include respective response engines 246 and 256. The memory 210 also includes a response engine 218 for issuing certain commands in the response channel, such as one or more of processors. For example, the response engine 218 can provide an invalidate acknowledgement command (InvalAck) as a response to enable a requester to cache an exclusive copy and to indicate that other cached copies of data have been invalidated. The response engines 218, 246 and 256 provide corresponding responses as response channel commands, which can include data or non-data responses.

Table 6 illustrates example commands that can be carried in an example response channel of the system 200. The response channel commands can be provided by a response engine of a target processor or from a home node when the directory 212 indicates that no exclusive copy of the requested data is cached. Response commands in this channel do not block other responses since response commands terminate either at a MAF entry, at a DIFT entry of a home node, or in the case of victims and write-backs, at the main memory.

TABLE 6

| Command Name | Has Data? | Description |
| --- | --- | --- |
| BlkShd | Y | Data returned in response to a Read or a RdShd (or a RdWSpec or RdShdWSpec); block is cached in the shared state. |
| BlkSpecShd | Y | Data returned in response to a FwdRdSpec or FwdRdShdSpec; block is cached in the shared state. |
| BlkExclCnt | Y | Data returned in response to a Read or RdMod (or a RdWSpec or RdModWSpec); block is cached in the exclusive state. A count of the number of invalidates sent to sharers (0 if none sent) is included with the command. |
| BlkSpecExcl | Y | Data returned in response to a FwdRdSpec or FwdRdModSpec; block is cached in the exclusive state. |
| BlkInval | Y | Data returned in response to a Fetch (or a FetchWSpec); block is not cached. |
| BlkSpecInval | Y | Data returned in response to a FwdFetchSpec; block is not cached. |
| SpecMiss | N | Response returned for any Fwd*Spec command for which the target did not have the exclusive copy. |

TABLE 6-continued

| Command Name | Has Data? | Description |
|---|---|---|
| SpecAck | N | Response from the home for *WSpec requests for which the directory controller determines that data is being supplied by the target of a Fwd*Spec. |
| Victim | Y | A write-back to home of modified data from an owner that will no longer cache a valid copy. |
| VictoShd | Y | A write-back to home of modified data from an owner that will cache a non-exclusive shared copy. |
| VicClean | N | An update sent to the home from an owner to downgrade its cached copy from exclusive (non-modified) to invalid. |
| VicCleanToShd | N | An update sent to the home from an owner to downgrade its cached copy from exclusive (non-modified) to shared. |
| VicAckShd | Y | Sent to home in response to a FwdRead or FwdRdShd that hits modified state in the owner, indicating that the owner provided BlkShd and transitioned its cached copy to a shared state. |
| VicSpecShd | Y | Sent to home in response to a FwdRdSpec or FwdRdShdSpec that hits modified state in the owner, indicating that the owner provided BlkShdSpec and transitioned its cached copy to a shared state. VicSpecShd specifies the original source processor (e.g., by processor ID). |
| VicAckExcl | Y | Sent to home in response to a FwdRead or FwdRdMod that hits modified state in the owner, indicating that the owner provided BlkExclCnt and transitioned its cached copy to an invalid state. |
| VicSpecExcl | Y | Sent to home in response to a FwdRdSpec or FwdRdModSpec that hits modified state in the owner, indicating that the owner provided BlkExclSpec and transitioned its cached copy to an invalid state. VicSpecExclk specifies the original source processor (e.g., by processor ID). |
| FwdAckShd | N | Sent to home in response to a FwdRead or FwdRdShd that hits exclusive (non-modified) state in the owner, indicating that the owner provided BlkShd and transitioned its cached copy to a shared state. |
| FwdSpecShd | N | Sent to home in response to a FwdRdSpec or FwdRdShdSpec that hits exclusive (non-modified) state in the owner, indicating that the owner provided BlkShdSpec and transitioned its cached copy to a shared state. FwdSpecShd specifies the original source processor (e.g., by processor ID). |
| FwdAckExcl | N | Sent to home in response to a FwdRead or FwdRdMod that hits exclusive (non-modified) state in the owner, indicating that the owner provided BlkExclCnt and transitioned its cached copy to an invalid state. |
| FwdSpecExcl | N | Sent to home in response to a FwdRdSpec or FwdRdModSpec that hits exclusive (non-modified) state in the owner, indicating that the owner provided BlkExclSpec and transitioned its cached copy to an invalid state. FwdSpecExcl specifies the original source processor (e.g., by processor ID). |
| FwdAckInval | N | Sent to home in response to FwdFetch that hits exclusive or modified state in the owner, indicating that the owner provided BlkInval, but did not transitions the state of its cached copy. |
| FwdMiss | N | Sent to home in response to a non-speculative Fwd* in the event that the target does not have a cached copy in an exclusive or modified state. |
| ShdtoDirtySuccCnt | N | Sent from the home in response to ShdtoDirty, indicating that the source of the request is recorded as a sharer by the directory, and thus may successfully transition its state to exclusive. A count of the number of invalidates sent to sharers (0 if none sent) is included with the command. |
| ShdtoDirtyFail | N | Sent from the home in response to ShdtoDirty, indicating that the source of the request no longer has a valid cached copy and fails the upgrade request and re-issue as a RdMod. |
| InvtoDirtyRespCnt | N | Sent from the home in response to InvaltoDirty, indicating that the source of the request may successfully transition its state to exclusive. A count of the number of invalidates sent to sharers (0 if none sent) is included with the command. |
| InvalAck | N | Sent from the target of an Inval to the source MAF controller as an acknowledgement. |

The protocol enables the network 200 to reduce the perceived latency associated with a request for a block of data. By way of example, assume that the processor 202 requires a block of data not contained locally in the cache memory 224. Accordingly, the processor 202 (as a requester) employs the MAF controller 232 to allocate an entry in the MAF 234 associated with a corresponding request for the required data. Assuming that the owner predictor 242 specifies a predicted target for the block of data, the MAF controller 232 employs the MAF entry to issue a request for the data with speculation (in the request channel). For instance, the MAF controller 232 provides the request with a speculative attribute to a directory controller at the home node. Since the owner predictor 242 has identified a predicted owner (e.g., the request is issued with speculation—See, e.g., Table 2), the MAF controller 232 also issues a corresponding forward channel request to one or more predicted nodes in the system 200, as identified by the owner predictor for the block of data. As a result, two substantially concurrent requests are provided through the switch interface 240 and to the switch fabric 208. The concurrent requests include a first request to the home node (in the request channel) and a second speculative request to one or more predicted nodes (in the forward channel).

At the home node, a directory controller receives the request and performs a look up in the directory 212 to ascertain the location of the owner node (if any) for the requested data. Assuming that the directory state information indicates that an exclusive cached copy of the requested data exits at an owner node, such as at the processor 204 (e.g., in the E-state), the directory controller employs the forward engine 216 to provide a corresponding forward channel request to the owner node 204 (See, e.g., Table 3). In response to the forward channel request from the home node, the response engine 246 accesses the cache line containing the requested data and provides a corresponding data response in the response channel (See, e.g., Table 4) to the requester. The response engine 246 can also perform any required state transition associated with the request, such as transitioning the cache line at the processor 204 from the E-state to the S-state. Examples of possible state transitions are provided below in Table 7. In a situation when no cached copy of the requested data exists in the system 200, the home node can employ the response engine 218 to provide response that includes a corresponding memory copy of the requested data to the requester 202 in the response channel via the switch fabric 208.

Assume that a speculative forward channel request is sent to the processor 206 concurrently with the request from the processor 202 to the home node. Continuing with the above example, since the processor 206 is not the owner of the requested data, the processor 206 responds to the forward channel request with a SpecMiss response via the response channel (e.g., see, Table 6). In circumstances when the owner predictor correctly identifies an owner node of the requested data, a race condition for the data can exist. This race condition, however, typically is between the forward channel speculative request from the requesting processor and the forward channel request from the home node in response to the original request that was issued with speculation. As mentioned above, the coherency protocol ensures that any coherent copy of the data returned to the requester (in the response channel) will be coherent.

For example, if the speculative forward channel request for the data from the requester arrives at the owner before the request from the home node, the owner node provides a corresponding response that includes a copy of the data. The owner also provides a corresponding message back to the home node. The message to the home node, for example, can identify the response as including data as well as the command type (or state) of the data response (e.g., a shared or exclusive copy). The directory controller at the home node thus can update the directory state information based on the owner message to the home node.

An example set of cache state transitions that can be employed by the network 200 for the type of source requests described above (Table 4) are provided below in Table 7. The protocol can employ a protocol optimization to cache data in the exclusive state if the directory indicates that there are no shared copies (e.g., sometimes referred to as private data optimized). The protocol can also employ a protocol optimization to cache data in the exclusive state if a previous owner caches the data in a modified state (a.k.a. migratory data optimized). Additionally, the protocol does not require a command to downgrade a shared copy to invalid nor is a command is required to modify an exclusive copy. Table 7 also demonstrates that a ShdtoDirty command will fail if an exclusive copy is cached remotely (e.g., because an Inval is likely on the way to the requester).

TABLE 7

| Source Command | Current Source Cache State | Next Source Cache State | Current Target Cache State | Next Target Cache State |
|---|---|---|---|---|
| Fetch or FetchWSpec/FwdFetchSpec | I | I | — | unchanged |
| RdShd or RdShdWSpec/FwdRdShdSpec | I | S | I | I |
|  | I | S | S | S |
|  | I | S | E | S |
|  | I | S | M | S |
| Read or ReadWSpec/FwdReadSpec | I | E | I | I |
|  | I | S | S | S |
|  | I | S | E | S |
|  | I | E[4] | M | I |
| RdMod or RdModWSpec/FwdRdModSpec or InvaltoDirtyReq | I | E | I | I |
|  | I | E | S | I |
|  | I | E | E | I |
|  | I | E | M | I |
| No command required | S | I | — | unchanged |
| ShdtoDirtyReq | S | E | I | I |
|  | S | E | S | I |
|  | S | S(I) | E, M | unchanged |
| VicClean | E | I | — | unchanged |
| VicCleantoShd | E | S | — | unchanged |
| No command required | E | M | — | unchanged |
| Victim | M | I | — | unchanged |
| VictoShd | M | S | — | unchanged |

In view of the foregoing structural and functional features described above, certain methods that can be implemented using a cache coherency protocol will be better appreciated with reference FIGS. 4-13. The examples in FIGS. 4-12 illustrate various interrelationships between requests and responses and state transitions that can occur for a given memory address (e.g., memory line) in different processor caches or memory devices. In each of these examples, time flows in the direction of an arrow labeled "TIME." Those skilled in the art may appreciate various other cases that can be implemented using the protocols described herein. Additionally, the following methodologies can be implemented by hardware (e.g., as one or more integrated circuits or circuit boards containing a plurality of microprocessors), software (e.g., as executable instructions running on one or more processors or controllers), or any combination thereof.

Figure 4:
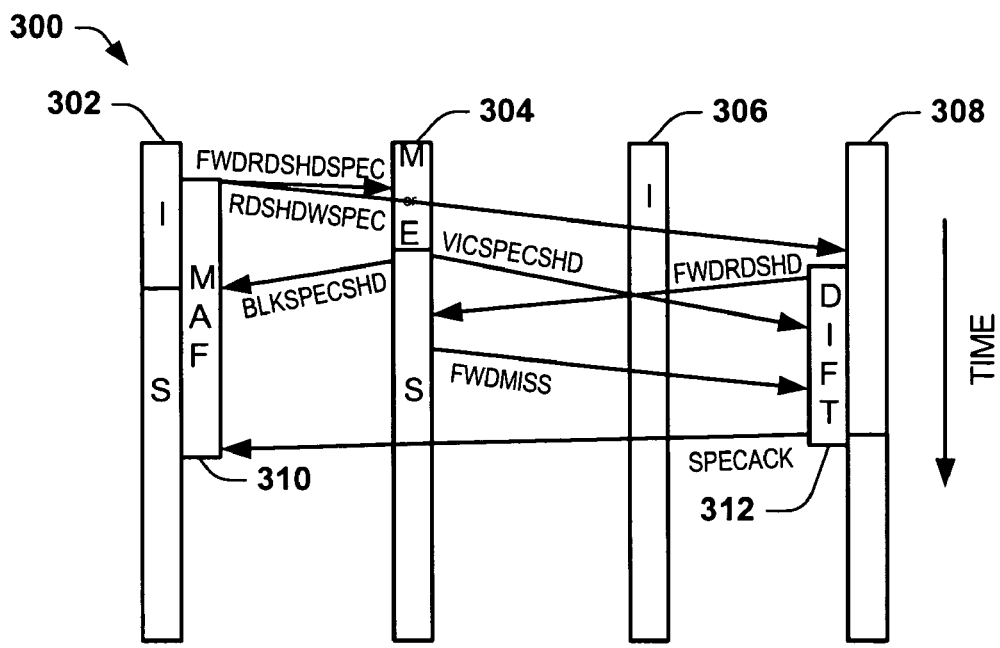
FIG. 4 depicts a first example of a timing diagram for a network employing a protocol.

FIG. 4 illustrates a multi-processor network 300 that includes a requester 302, a plurality of potential target nodes 304 and 306 and a home node 308. Initially, the nodes 302 and 306 are in the Invalid state for the block of data and the node 304 is in the M or E-state for the block of data. The node 302 allocates a MAF entry 310 associated with a speculative read (RDSHDWSPEC) command. An owner predictor (not shown) associated with the node 302 identifies the node 304 as a predicted node for the request. The node 302 thus issues the RDSHDWSPEC request to the home node 308 in parallel with a speculative forward read request (FWDRDSHDSPEC) to the predicted node 304.

In response to the FWDRDSHDSPEC command from the requester 302, the node 304 provides a data response (BLKSPECSHD) providing a shared copy of the data to the requester. The node 304 also transitions from the M or E-state to the S-state and issues a victim (VICSPECSHD) command to the home node 308. The requester 302 changes the state of the data at the requester 302 from the I-state to the S-state in response to the BLKSPECSHD response. The VICSPECSHD command provides the home node 308 with an up-to-date copy of the data as well as indicates that the block of data has been shared with the requester 302. The home node thus updates the directory state information associated with the data to identify the nodes 302 and 304 both as having shared copies.

In response to the RDSHDWSPEC command from the requester 302, the home node 308 allocates a DIFT entry 312 the request since the current state information indicates an exclusive cached copy at the node 304. After allocating the DIFT entry 312, the home node 308 issues a corresponding FWDRDSHD command to the owner of the block of data, namely the node 304. Since, at the time the node 304 receives the FWDRDSHD command, the node already has the data in the S-state, the node 304 issues a FWDMISS response to the home node 308. The home node 308 issues a SPECACK to the requester 302 acknowledging that the block of data has been provided by the predicted node 304. The home node 308 then retires the DIFT entry 312. In response to the SPECACK from the home 308, the requester retires the MAF entry 310. In the example of FIG. 4, the speculative FWDRDSHDSPEC command results in a cache hit at the predicted node 304. Accordingly, the requester 302 receives the requested block of data with reduced latency than a situation requiring the read request to be provided first to the home node 308.

Figure 5:
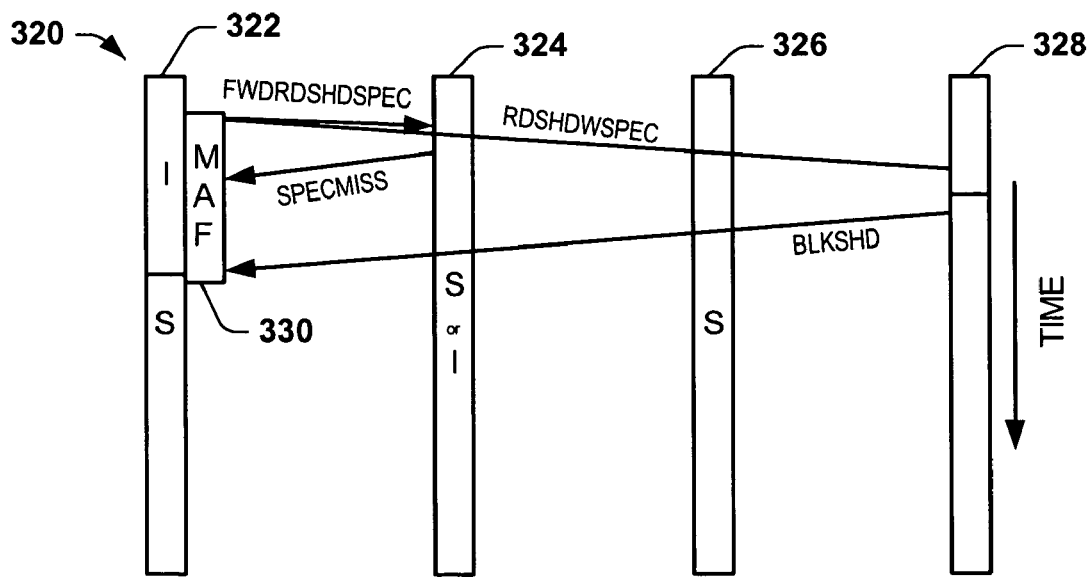
FIG. 5 depicts a second example of a timing diagram for a network employing the protocol.

FIG. 5 illustrates an example of a multi-processor network 320 employing the protocol described herein. The network 320 includes a requester 322, a plurality of other processor nodes 324 and 326 and a home node 328. Initially, the requester 322 is in the I-state for the block of data, the processor node 324 could be in the S or I-state, and the processor node 326 is in the S-state.

The requester 322 allocates a MAF entry 330 associated with a speculative request. The requester 322 issues parallel requests, including a speculative read (RDSHDWSPEC) request provided to the home node 328 and a FWDRDSHDSPEC command provided concurrently with to the node 324 (as determined by an owner predictor). In response to receiving the FWDRDSHDSPEC command from the requester 322, the node 324 issues a SPECMISS command to the requester indicating that the target does not have a modified or exclusive copy of the block of data.

The home node 328 issues a corresponding BLKSHD response to the requester 322 in response to the RDSHDWSPEC command from the requester 322. The BLKSHD response includes a shared copy of the requested data. The home node 328 also updates the associated directory state information to identify the requester as having a shared copy. The requester 322 retires the MAF entry 330 in response to the BLKSHD response from the home node.

Figure 6:
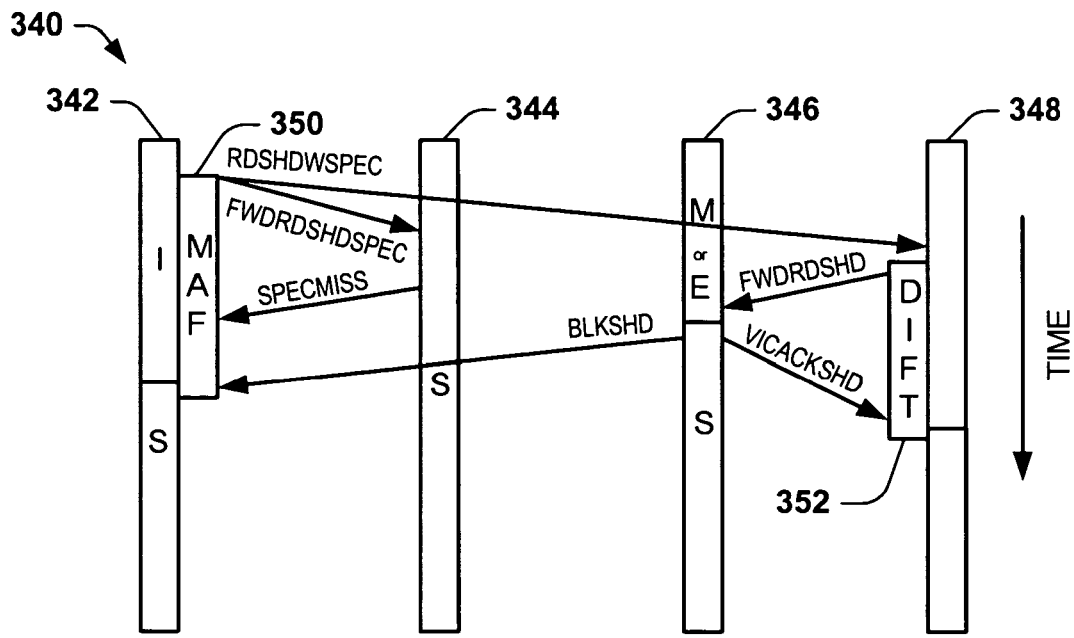
FIG. 6 depicts a third example of a timing diagram for a network employing the protocol.

FIG. 6 illustrates another example of a network 340 implementing the protocol described herein. The network 340 includes a requester 342, a plurality of other processor nodes 344 and 346 and a home node 348. Initially, the requester 342 is in the I-state, the node 344 is in the S-state and the node 346 is in one of the M or E-state. The requester 342 allocates a MAF entry 350 associated with a speculative request. The requester 342 issues substantially concurrent requests to the node 344 (as determined by the owner predictor) and to the home node 348. Specifically, the requester 342 sends a FWDRDSHDSPEC command to the node 344 and a RDSHDWSPEC command to the home node 348.

In response to the FWDRDSHDSPEC command from the requester 342, the node 344 issues a SPECMISS command to the requester, indicating that the target does not have a modified or exclusive copy of the block of data. Since, in the example of FIG. 6, an exclusive cached copy exists at the node 346, the home node 348 allocates a DIFT entry 352 in response to the RDSHDWSPEC command. After allocating the DIFT entry 352, the home 348 issues a corresponding FWDRDSHD command to the owner node 346. The owner 346 then responds to the FWDRDSHD command by issuing a BLKSHD response to the requester 342, which shares the block of data with the requester. The owner 346 also issues a VICACKSHD command to the home node 348 and transitions from the M or E-state to the S-state in conjunction with providing the BLKSHD response.

In response to receiving the BLKSHD from the owner 346, the requester 342 transitions from the I-state to the S-state and retires the MAF entry 350. The home node 348 stores a copy of the updated data in associated memory in response to the VICACKSHD command as well as updates the directory state information for the data. The directory state information thus identifies the requester 342 and the owner node 346 also as sharers. The home node 348 also retires the DIFT entry 352 in response to the VICACKSHD command.

Figure 7:
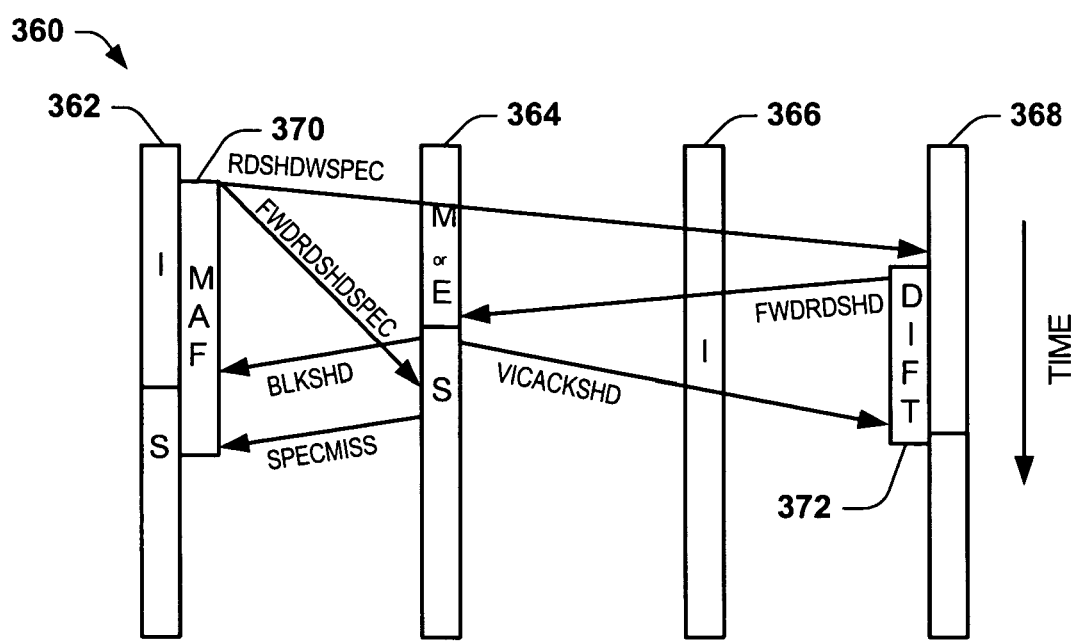
FIG. 7 depicts a fourth example a timing diagram for a network employing the protocol.

FIG. 7 illustrates an example of another network 360 implementing the protocol described herein. Specifically, the network 360 that includes a requester 362, a plurality of processor nodes 364 and 366 and a home node 368. Initially, the nodes 362 and 366 are in the I-state for the block of data and the processor node 364 can be in either of the M or E-state for the block of data. The requester 362 allocates a MAF entry 370 and issues parallel requests to the node 364 (as determined by the owner predictor) and to the home 368. That is, the requester 362 sends a FWDRDSHDSPEC command to the node 364 and a RDSHDWSPEC command to the home node 368.

Since a cached copy of the requested data exists in the network 360 (based on directory state information maintained by the home node), the home 368 allocates a DIFT entry 372 for the RDSHDWSPEC command. The home 368 then issues a corresponding FWDRDSHD command to the owner of the block of data, namely to the node 364. Thus, in the example of FIG. 7, the predicted node is the actual owner node for the requested data. However, since the block of data has not yet been shared with the requester 362 (e.g., the node 364 has not received the FWDRDSHDSPEC) and the target 364 has the data in the M or E-state, the node 364 responds to the FWDRDSHD command by providing a BLKSHD command to the requester 362. The node 364 also issues a VICACKSHD command to the home node 368. The VICACKSHD command includes a copy of the data as well as indicates that a shared copy of the data has been provided to the requester 362. The home node 368 updates the directory state information (identifying nodes 362 and 364 as sharers) and the home 368 retires the DIFT entry 372 based on the VICACKSHD command. The state of the data at the requester 362 and at the owner 364 transitions to the S-state.

Thereafter the FWDSHDSPEC command arrives at the node 364. The node 364 then issues a SPECMISS command response to the FWDRDSHDSPEC command from the requester 362 since the node 364 no longer has a modified or exclusive copy of the block of data. The requester 362 retires the MAF entry 370 in response to the SPECMISS. The requester 362 has thus received the requested block of data employing the non-speculative functionality of the directory-based protocol, resulting in a three-hop transaction.

Figure 8:
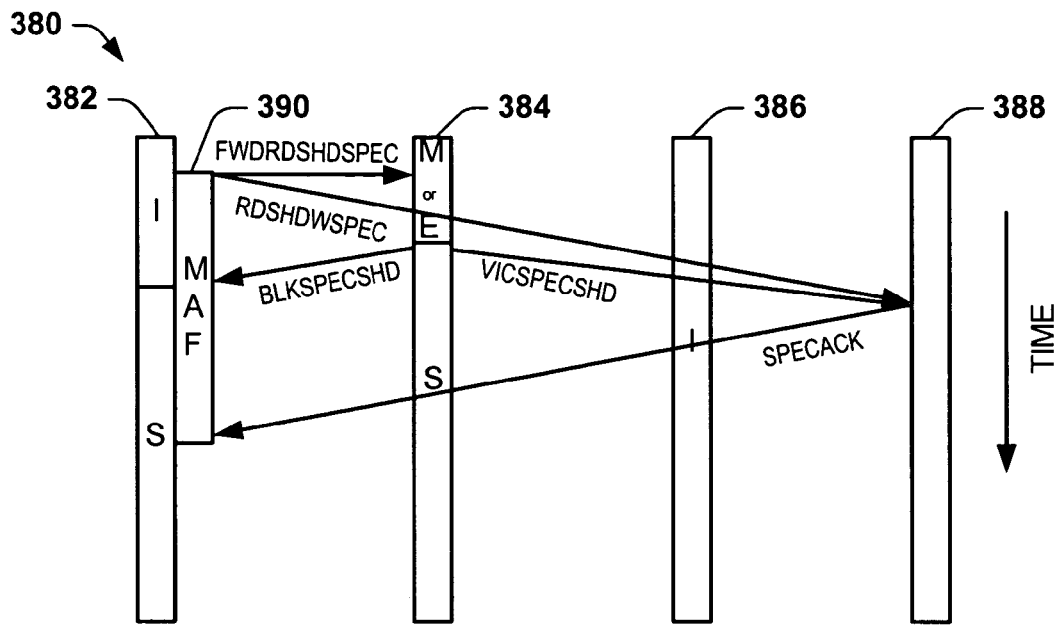
FIG. 8 depicts a fifth example of a timing diagram for a network employing the protocol.

FIG. 8 illustrates yet another example of a multi-processor network 380 that includes a requester 382, processor nodes 384 and 386 and a home node 388. Initially, the processor nodes 382 and 386 are in the I-state and the processor node 384 is in the M or E-state. The requester 382 allocates a MAF entry 390 and issues parallel requests to the node 384 (as determined by an associated owner predictor) and to the home node 388. Specifically, the requester 382 sends a FWDRDSHDSPEC command to the node 384 and a corresponding RDSHDWSPEC command to the home node 388 for the data.

In response to the FWDRDSHDSPEC command from the requester 382, the predicted node 384 issues a BLKSPEC-SHD command to the requester, providing a shared copy of the requested data to the requester 382. The state of the data at the requester 382 also transitions from the I-state to the S-state in response to the BLKSPECSHD command. The target 384 issues a VICSPECSHD command to the home node 388 concurrently with the BLKSPECSHD command and transitions from the M or E-state to the S-state. The VICSPECSHD command also provides a copy of the data to the home node 388 as well as indicates that a shared copy has been provided to the requester 382 and that the node 384 has transitioned to the S-state. The home node 388 updates the directory state information based on the information provided in the VICSPECSHD command.

In the example of FIG. 8, the home node 388 receives the VICSPECSHD substantially concurrently with (or prior to) the RDSHDWSPEC command from the requester 382. Consequently, the home node 388 updates the state information in the directory and issues a SPECACK command to the requester 382 indicating that another node is supplying (or has already supplied) the data. The requester 382 retires the MAF entry 390 after receiving the SPECACK command from the home node 388. Accordingly, in the example of FIG. 8, the requester 382 has received the requested data with less latency than had the home node been required to issue a forward request to the owner of the node.

Figure 9:
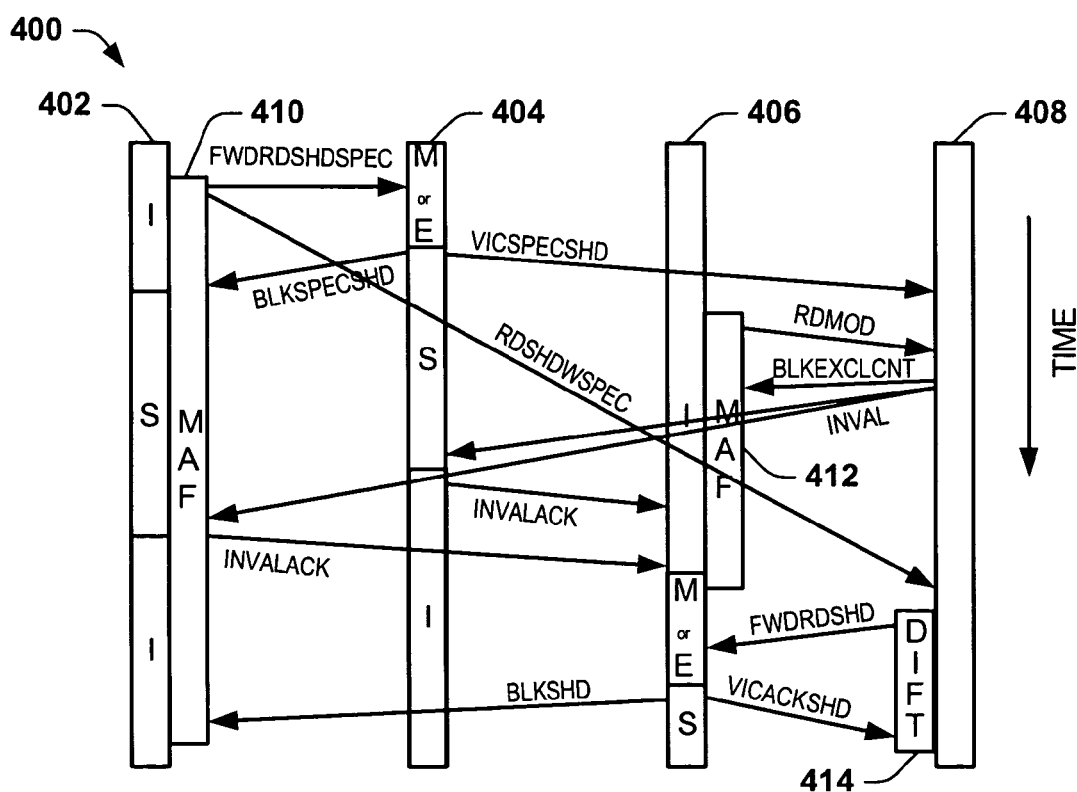
FIG. 9 depicts a sixth example of a timing diagram for a network employing the protocol.

FIG. 9 depicts an example of another network 400 that includes a requester 402, nodes 404 and 406 and a home node 408. The requester 402 is initially in the I-state, the node 404 is initially in the M or E-state, and the node 406 is initially in the I-state. The requester 402 allocates a MAF entry 410 in connection with a read with speculative request for shard data (RDSHDWSHPEC). An owner predictor (not shown) associated with the node 402 identifies the node 404 as a predicted node for the request. The node 402 thus issues the RDSHDWSHPEC request to the home node 408 in parallel with a speculative forward read request (FWDRD-SHDSPEC) to the predicted node 404.

Since the predicted node 404 is in the M or E-state when the FWDRDSHDSPEC command is received, the node provides a response that includes a copy of the requested data. In particular, the node 404 transitions from the M or E-state to the S-state and provides a shared data response (BLKSPECSHD) to the node 402. In response to receiving the BLKSPECSHD response from the node 404, the node 402 transitions from the I-state to the S-state. In conjunction with providing the BLKSPECSHD response to the node 402, the predicted node 402 also provides a victim acknowledgement message (VICSPECSHD) to the home node 408, indicating that the node 404 has provided a shared speculative response and has transitioned its cache copy to the shared state. This enables the home node 408 to modify its directory state information to identify that the nodes 402 and 404 each contains a shared copy of the data.

In the example of FIG. 9, the node 406 subsequently requires a copy of data and thus allocates a MAF entry 412 associated with the request. The node 406 provides a corresponding request (RDMOD) to the home node 408, which is a non-speculative read-modify request. Since the home node 408 has a coherent copy of data when the RDMOD request is received (due to the VICSPECSHD message from the node 404), the home node 408 provides a data response (BLKEXCLCNT) directly to the node 406. The home node 408 also sends an invalidate command (INVAL) in a forward channel to the nodes 402 and 404 that have shared copies based on the directory state information maintained in the home node 408. Each of the nodes 402 and 404 responds with an acknowledgement message (INVALACK) back to the requester 406. The nodes 402 and 404 each also transitions from the S-state to the I-state in response to the INVAL command from the home node 408. The node 402 further changes its MAF state to indicate that any subsequent fill data response be filled invalid into the cache (since a MAF is pending for the same address). The node 406 can transition from the I-state to the M or E-state after receiving the INVALACK messages from the nodes 402 and 404. For example, the BLKEXCLCNT response provided by the home node 408 can include a count field indicating the number of sharer nodes to which the INVAL commands were provided. The node 406 thus can employ the count field in the BLKEXCLCNT response to control when to perform the state transition at as well as enable the node 406 to retire the MAF 412.

In the example of FIG. 9, the RDSHDWSPEC command from the node 402 arrives at the home node 408 after the node 406 has retired the MAF 412. Since an exclusive cached copy of the data now exists in the network 400, the home node 408 creates a corresponding DIFT entry 414 for managing the request. The home node 408 then provides a forward channel read (FWDRDSHD) command to the node 406 based on the directory state information maintained at the home node. In response to the FWDRDSHD command, the node 406 transitions from the M or E-state to the S-state and provides a data response (BLKSHD) to the node 402 as well as a corresponding victim acknowledgement message (VICACKSHD) back to the home node 408. The VICACK-SHD message indicates that the node 406, as an owner node, has provided a shared copy of the data to the requester 402 and has transitioned its cache state to the S-state. The home node 408 can update the pertinent directory state information to reflect the state transition at the requester 402 and retire the DIFT entry in response to the VICACKSHD command from the node 406.

In the example FIG. 9, the BLKSHD response and data provided therewith can be dropped by the node 402 even through it may contain a different version of coherent data. The protocol implemented by the network 400 provides that the each copy of data (provided with the BLKSPECSHD response) is ensured to be coherent. In the example of FIG. 9, the node 402 had already consumed the requested data prior to receiving the BLKSHD response. In response to the BLKSHD response, the node 402 can retire the MAF entry 410 since the transaction has been completed.

Figure 10:
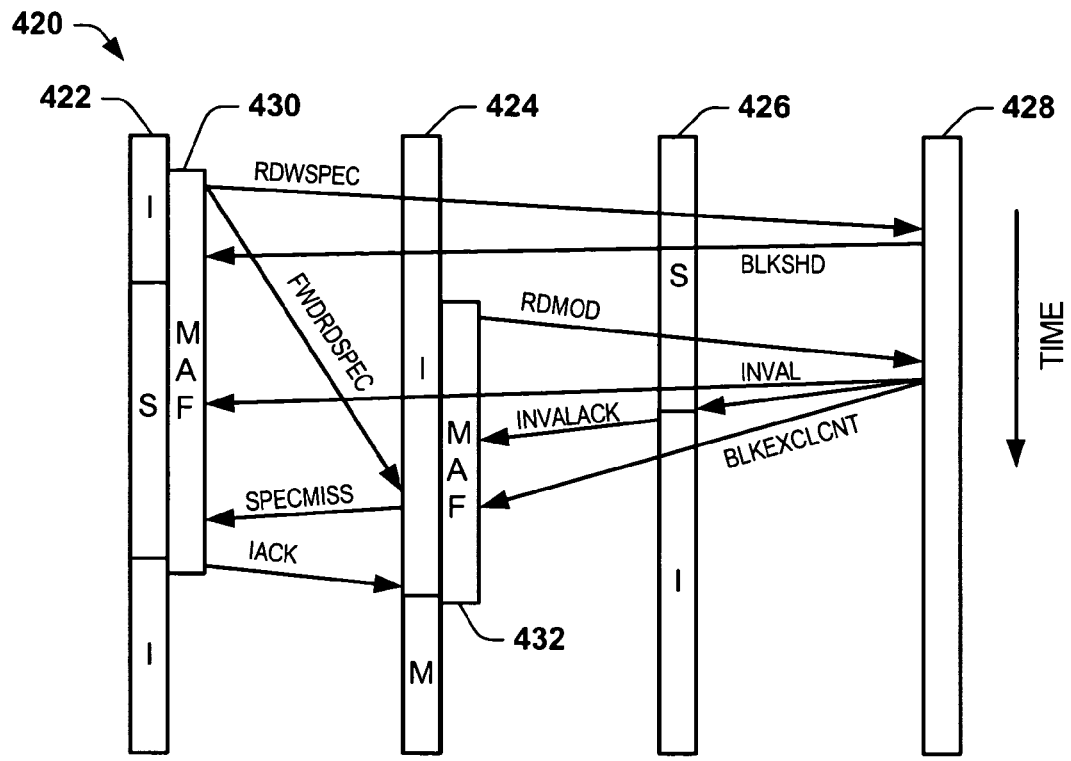
FIG. 10 depicts a seventh example a timing diagram for a network employing the protocol.

FIG. 10 illustrates another example of a network 420 that includes a requester 422, a target node 424, a sharer node 426 and a home node 428. Initially, the nodes 422 and 424 are in the I-state and the sharer node 426 is in the S-state, which state information can be maintained in the directory of the home node 428. The requester 422 allocates an MAF entry 430 for a speculative read request (RDWSPEC). Thus, the node 422 provides the RDWSPEC request to the home node 428 and a corresponding forward read request (FW-DRDSPEC) to a predicted node, namely the node 424. The home node 428 provides a data response (BLKSHD) to the RDWSPEC request from the requester 422, which response includes a shared copy of the requested data. In conjunction with providing the BLKSHD response, the home node 428 also updates its directory state information to identify the requester 422 as containing the shared copy of the data. The node 422 transitions from the I-state to the S-state in response to the BLKSHD response from the home node 428.

The node 424 allocates a non-speculative MAF entry 432 and issues a corresponding read modify request (RDMOD) for an exclusive copy of the data to the home node 428. The home node 428 responds by providing an invalidate command (INVAL) to the nodes 422 and 426 having cached shared copies of the requested data. Since no exclusive cached copy exists in the network 420, the home node 428 returns a response (BLKEXCLCNT) to the requesting node 424 that contains an exclusive copy of the requested data. The home node 428 also updates its directory state information to identify the node 424 as containing an exclusive cache copy of the data.

Substantially in parallel with the INVAL commands, the FWDRDSPEC command from the prior requester 422 arrives at the predicted node 424. The node 424, being in the I-state and having an outstanding MAF entry 432, responds to the FWDRDSPEC request with a SPECMISS response. The node 422 transitions from the S-state to the I-state as well as responds to the INVAL command from the home node by providing an invalid acknowledgment message (INVALACK) to the node 424. In the instant example, the requester 422 defers responding to the INVAL with the INVALACK until all requisite responses have been received for the outstanding speculative requests. After receiving the SPECMISS response from the node 424, the node 422 also can retire the MAF entry 430. The node 424 can transition from the I-state to the M-state and retire the MAF entry 432 after receiving the BLKEXCLCNT response and the specified number of INVALACK messages.

Figure 11:
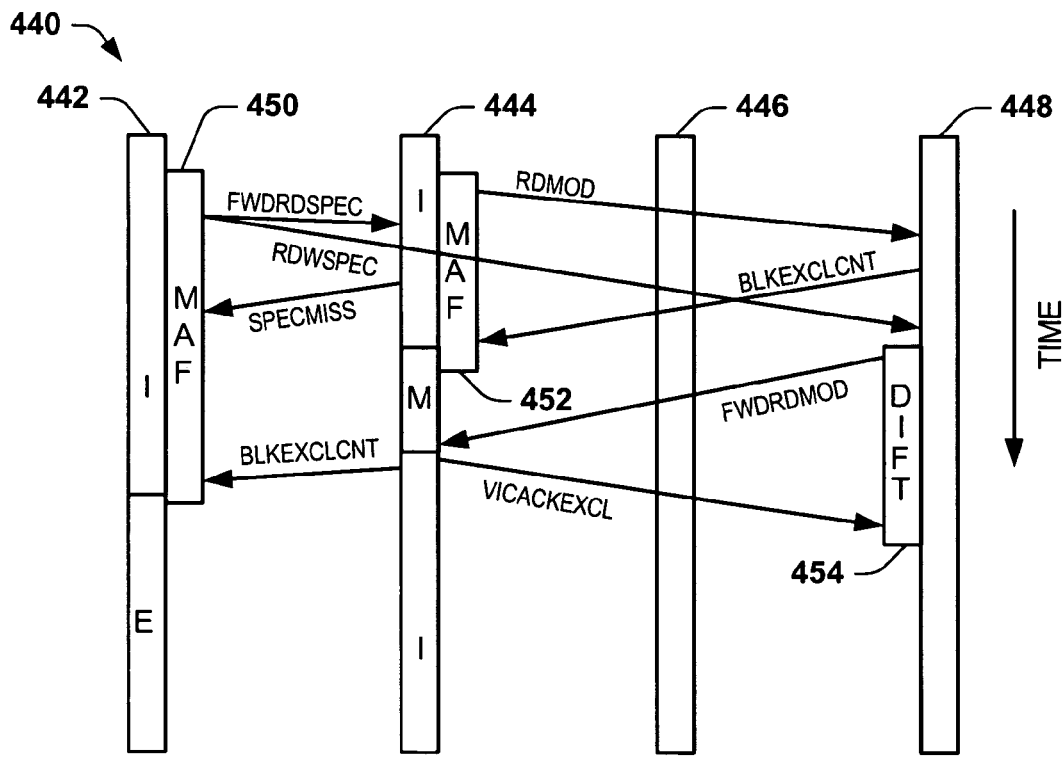
FIG. 11 depicts an eighth example of a timing diagram for a network employing the protocol.

FIG. 11 depicts an example of another network 440 implementing the protocol described herein. The network 440 includes nodes 442, 444, 446 and a home node 448, which home node maintains directory state information for the network 440. In the example of FIG. 11, the node 442 allocates an MAF entry 450 associated with a speculative read request (RDWSPEC). Since the node 444 requires a copy of the same line of data as the node 442, the node 444 allocates a corresponding MAF entry 452 associated with a non-speculative read-request (RDMOD) for an exclusive copy of the data. The node 444 then provides the corresponding RDMOD request to the home node 448.

The node issues the RDWSPEC request to the home node 448 in parallel with a corresponding speculative forward read request (FWDRDSPEC) to a predicted node, namely the node 444. The predicted node 444 responds to the FWDRDSPEC with a SPECMISS response. The FWDRDSPEC request does not result in a cache hit since the node 444 is in the I-state and has an outstanding MAF entry 452. Consequently, the transaction will complete via the non-speculative aspects of the protocol, as described herein.

In example FIG. 11, the home node 448 receives the RDMOD from the node 444 prior to the RDWSPEC request from the node 442. Thus, the home node 448 provides a data response (BLKEXCLCNT) to the node 444, which response includes an exclusive copy of the requested data. The home node 448 also updates its directory state information to identify the node 444 as containing an exclusive cached copy of the data.

Subsequent to providing the BLKEXCLCNT response, the home node 448 receives the RDWSPEC request from the node 442. Since the updated directory state information indicates that an exclusive cached copy of the requested data exists at the node 444, the home node 448 creates a DIFT entry 445 and issues a forward read-modify request (FWDRDMOD) to the node 444. The node 444 provides an exclusive data response (BLKEXCLCNT) to provide the data to the node 442. The node 442 fills the data into the cache of the node and transitions from the I-state to the E-state in response to the BLKEXCLCNT response.

The node 444 also transitions from the M-state to the I-state in conjunction with providing the BLKEXCLCNT response to the requesting node 442, as well as provides a victim acknowledgement message (VICACKEXCL) back to the home node 448. The home node 448 updates the directory state information based on the VICACKEXCL message to identify the node 442 as containing an exclusive cached copy of the data. The home node 448 then retires the DIFT entry 454.

Figure 12:
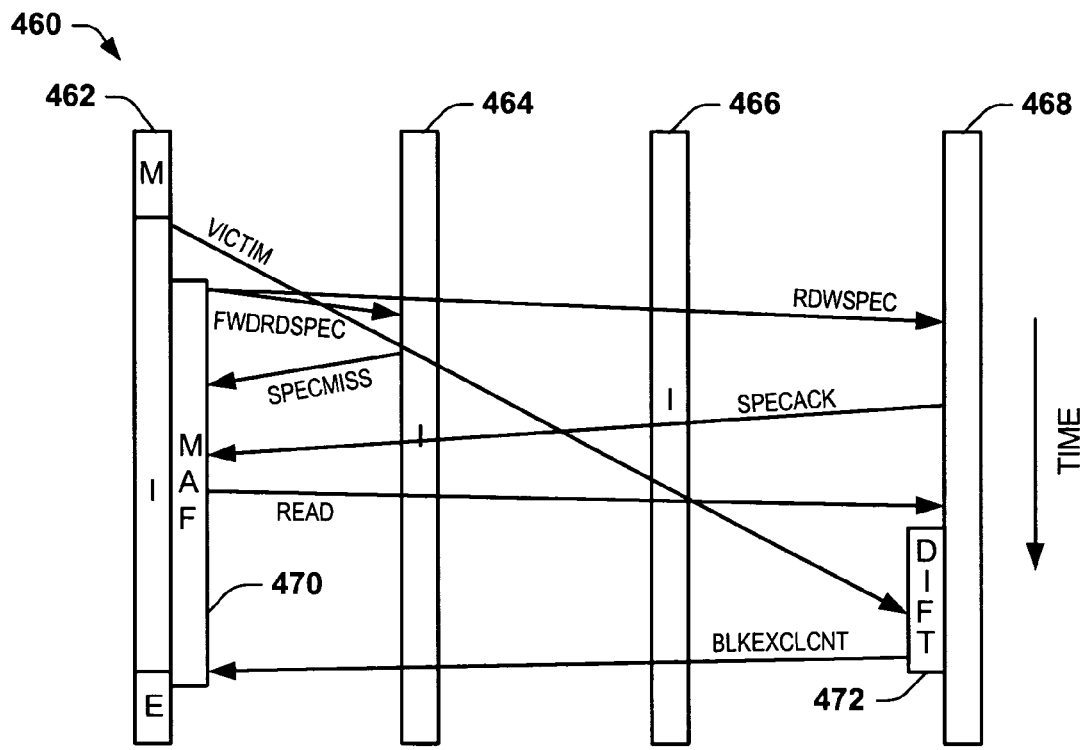
FIG. 12 depicts a ninth example of a timing diagram for a network employing the protocol.

FIG. 12 depicts an example of a network 460 illustrating a victim self-race condition that might occur according to the protocol described herein. The network 460 includes a requester 462, potential target nodes 464 and 466 and a home node 468. The node 462 initially contains an exclusive cached copy of the requested data in the M-state. The directory state information is maintained at the home node 468. The node 462 victimizes the data by issuing a VICTIM command (in the response channel) to the home node 468 and transitions from the M-state to the I-state. The VICTIM command corresponds to a write back to the home and includes a copy of the modified data from the node 462.

While in the I-state and prior to the home node 468 processing the VICTIM command, the node 462 allocates a MAF entry 470 associated with a speculative read request for the previously victimized data. The node 462 issues a speculative read request (RDWSPEC) to the home node 468 in parallel with a forward speculative read request (FWDRDSPEC) to a predicted owner node, namely the node 464. The node 464, being in the I-state when the FWDRDSPEC command is received, provides a SPECMISS response to the node 462. The home node 468 also provides a non-data acknowledgement response (SPECACK) based on the directory state information indicating that an exclusive cached copy exists in the network 460. Since the requesting node 462 is in the I-state and has received no data response to either of the speculative read and forward requests, the node reissues the read request without speculation, namely as a non-speculative read (READ) request to the home node 468.

The home node 468 allocates a corresponding DIFT entry 472 in response to the READ request since, at the time the READ request is received, the directory state information still indicates that the node 462 contains an exclusive cached copy of the requested data. In the example of FIG. 12, the VICTIM command arrives at the home node 468 while the DIFT entry is active, which provides the home node with a coherent copy of the requested data. Since no exclusive cached copy still exists in the network 460, the home node 468 provides a corresponding data response (BLKEXCLCNT) to the node 462. The home node 468 also updates the corresponding directory state information to identify the node 462 as having an exclusive cached copy and retires the DIFT entry 472. The node 462 transitions from the I-state to the E-state in response to the BLKEXCLCNT response from the home node 468, thereby caching an exclusive copy of the requested data. The node 462 then retires the MAF entry 470.

From the example of FIG. 12, those skilled in the art will appreciate that VICTIM commands can create some interesting races with a subsequent request from the same processor or with a request from another processor. A victim late race can occur, for example, when a forward request arrives at its target after it has been victimized. If the forward is speculative, it simply returns SpecMiss, and the transaction acquires its data via the non-speculative path. If the forward is non-speculative, then a FwdMiss is returned to the home and the DIFT matches the FwdMiss with the victim. The data is then taken from the victim, using memory as its buffer, and returned to the source.

FIG. 12 depicts a victim self race in which the requester 462 victimizes a line, and shortly thereafter issues a request to reacquire the data. The subsequent request races the VICTIM to the home node 468. The directory can identify this race by noting an exclusive owner for the data that matches the source of the request.

There can be a subtle difference between the resolution of the victim self race for speculative and non-speculative requests. For instance, the resolution for self-racing transactions that do not employ speculation is for the home node to allocate a DIFT entry and wait for the victim command to arrive. A request issued with speculation cannot use the same resolution as the non-speculative read, however. A home request component of a speculative transaction arrives and is processed after the target of a successful speculated forward has issued a response to the home that names the source of the transaction as the new owner. The response returned for the home request in this case is a SpecAck. A SpecAck is also returned for the victim self race.

In view of the foregoing, those skilled in the art will appreciate that the protocol described herein is scalable and can be utilized in conjunction with existing directory-based protocols. The protocol described herein can be considered a high-performance adjunct that can be employed to improve performance by including direct cache-to-cache transfers. The protocol provides latency performance similar to source-broadcast protocols. Unlike many source broadcast-based protocols, the approach described herein can scale to larger networks because the protocol does not need to broadcast in order to find a cached copy. The protocol can achieve better latencies because the system allows a requester to directly target one or remote caches to snoop in parallel to reading the directory. If one of the speculated targets is the owner of the block, then the owner can supply the data directly. The owner can further update the directory state, potentially after the requester has consumed the block further reducing latency. If none of the speculated targets own the block, then the path via the directory provides the data.

The protocol introduces an inherent race condition by issuing parallel requests to different places for the same cache line that can be difficult to reconcile. In a multi-processor system, allowing multiple requests from different sources to the same block introduces a conflict condition. Coherence protocols rely on the ability to discern where the coherent copy of the data resides at any given time. Coherence protocols also enforce fairness and guarantee forward progress, while yielding the best performance possible. The system reconciles these functions on a network with no network ordering requirements.

Figure 13:
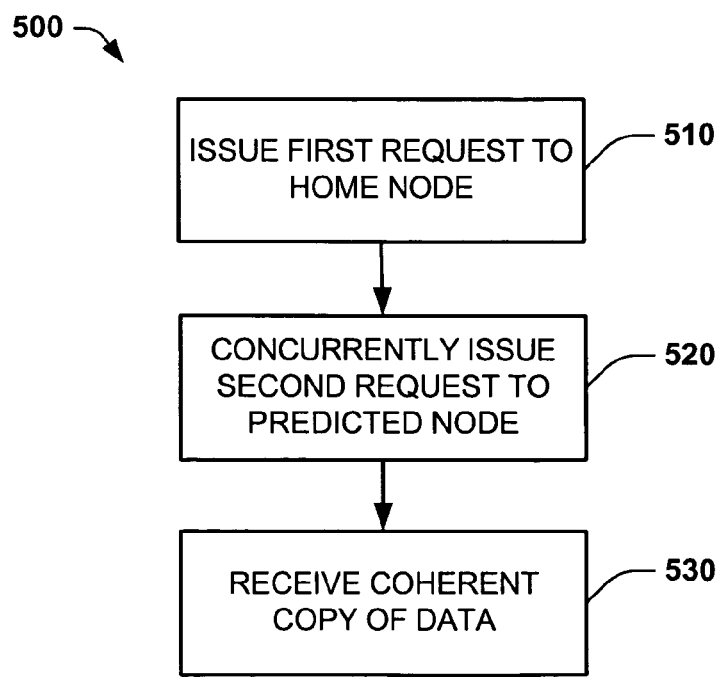
FIG. 13 depicts a flow diagram illustrating a method.

FIG. 13 depicts an example of a method 500 that includes issuing a first request for a block of data from a requester to a home node, as shown at 510. The method also includes concurrently issuing a second request for the block of data from a requester to a predicted node based on the first request, as shown at 520. The method also includes receiving at least one coherent copy of the block of data at the requester from an owner node, if the owner node has an exclusive cached copy of the block of data, and from the home node, if no exclusive cached copy of the block of data exists when the home node receives the first request, as shown at 530.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A multi-processor system comprising:
   a requesting node that provides a first request for data to a home node, the requesting node being operative to provide a second request for the data to at least one predicted node in parallel with first request, the requesting node receiving at least one coherent copy of the data from at least one of the home node and the at least one predicted node; and
   an owner predictor programmed to determine the at least one predicted node that is associated with the first request.

2. The system of claim 1, wherein the requesting node further comprises the owner predictor, the owner predictor being operative to determine the at least one predicted node based on the first request being provided as a speculative type of request.

3. The system of claim 1, wherein a cached copy of the data exists in the system, the home node issuing a third request for the data to an owner node having the cached copy of the data.

4. The system of claim 3, wherein the system employs a directory-based cache coherency protocol, the home node further comprising a directory that maintains directory state information associated with the data, the home node issuing the third request to the owner node based on the directory state information indicating that the owner node has an exclusive cached copy of the data.

5. The system of claim 3, wherein the owner node provides a response to one of (i) the home node and (ii) the home node and the requesting node, the owner node providing the response based on a state of the cached copy of the data at the owner node.

6. The system of claim 3, wherein requesting node provides the first request to the home node in a request channel and the second request to the at least one predicted node in a forward channel, the home node issuing the third request to the owner node in the forward channel, and each of the owner node and the at least one predicted node providing a respective response in a response channel.

7. The system of claim 6, wherein the system employs a directory-based cache coherency protocol in which requests for the data in the forward channel do not block.

8. The system of claim 3, wherein the at least one predicted node comprises the owner node having an exclusive cached copy of the data, the owner node providing a data response to the requesting node based on which of the second request and the third request arrives at the owner node first.

9. The system of claim 8, wherein the owner node provides a victim message to the home node and the data response to the requesting node in response to the second request arriving at the owner node prior to the third request, the home node providing a speculation acknowledgement to the requesting node in response to the victim message from the owner node.

10. The system of claim 8, wherein the owner node provides a victim message to the home node in response to the third request arriving at the owner node prior to the second request, the owner node providing the data response to the requesting node in response to the third request from the home node.

11. The system of claim 3, wherein the at least one predicted node further comprises a target node having a cache that includes the data having one of an invalid state and a shared state, the at least one predicted node providing a miss response to the requesting node in response to the second request, and the owner node providing a data response to the requesting node in response to the third request.

12. A multi-processor network comprising:
a requesting processor that provides a first request for data to a home node;
the home node comprising a directory that maintains directory state information associated with the data, the home node being operative to provide a second request to an owner processor in response to the first request if the directory state information indicates that the owner processor has a cached copy of the data; and
an owner predictor associated with the requesting processor, the owner predictor being operative to identify at least one predicted node associated with the first request, the first processor providing a third request for the data to the least one predicted node substantially concurrently with the first request.

13. The network of claim 12, wherein the requesting processor is operative to selectively provide the first request as one of a speculative type of request and a non-speculative type of request, the owner predictor being operative to determine the at least one predicted node and enable the requesting processor to provide the third request if the first request is provided as the speculative type of request.

14. The network of claim 12, wherein the owner processor provides a response based on a state of the cached copy of the data at the owner processor, the owner processor providing one of (i) a non-data response to the home node and (ii) data responses to the home node and to the requesting processor.

15. The network of claim 12, wherein the first request is provided in a request channel, and the second and third requests are each provided in a forward channel.

16. The network of claim 15, wherein the data is returned to the requesting processor as a response in a response channel, the response being provided by one of the home node and the owner processor based on whether the owner processor has an exclusive cached copy of the data.

17. The network of claim 15, wherein the system employs a directory-based cache cohere icy protocol in which requests in the forward channel do not block.

18. The network of claim 12, wherein the at least one predicted node comprises the owner processor having an exclusive cached copy of the data, the owner processor providing a data response to the requesting processor in response to which of the second request and the third request that arrives at the owner node first.

19. The network of claim 18, wherein the owner processor provides a victim message to the home node and the data response to the requesting node in response to the third request arriving at the owner processor prior to the second request, the home node providing a speculation acknowledgement to the requesting processor in response to the victim message from the owner processor.

20. The network of claim 18, wherein the owner processor provides a victim message to the home node in response to the second request arriving at the owner processor prior to the third request, the owner processor also providing the data response to the requesting processor in response to the second request from the home node.

21. The network of claim 12, wherein the at least one predicted node further comprises a target node having a cache that includes the data having one of an invalid state and a shared state, the at least one predicted node providing a miss response to the requesting node in response to the second request, and the owner processor providing a data response to the requesting node in response to the third request.

22. The network of claim 12, further comprising an unordered network interconnect that enables communication of requests and responses among the requesting processor, the at least one predicted node, the owner processor and the home node.

23. A multi-processor system comprising:
means for providing a first request for requested data from a requester to a home node;
means for determining a predicted target node for the requested data based on the first request;
means for selectively providing a second request to the predicted target node for the requested data based on the first request, the second request being provided in parallel with the first request; and
means for providing a coherent copy of the requested data to the requester in response to at least one of the first request and the second request.

24. The system of claim 23, further comprising:
means for ascertaining whether an owner node has an exclusive cached copy of the requested data; and
means for providing a third request for the data from the home node to the owner node when the owner node has the exclusive cached copy of the requested data.

25. The system of claim 24, wherein the means for providing the coherent copy of the requested data comprises one of (i) the home node, in response to the first request, when no exclusive cached copy of the requested data exists and (ii) the owner node, in response to one of the second request and the third request, when the owner node has the exclusive cached copy of the requested data.

26. The system of claim 25, further comprising means for providing a response that includes the coherent copy of the requested data from the owner node to the requester and for sending a corresponding victim acknowledgement message from the owner node to the home node in response to the second request.

27. The system of claim 25, further comprising means for changing a state of the cached copy of the requested data at the owner node in response to providing the response that includes the coherent copy of the requested data from the owner node to the requester.

28. A method comprising:
issuing a first request for a block of data from a requester to a home node;
concurrently issuing a second request for the block of data from the requester to a predicted node based on the first request;
selectively providing the first request as one of a speculative type of request and a non-speculative type of request;

the second request being concurrently issued to the at least one predicted node only if the first request is provided as the speculative type of request; and receiving at least one coherent copy of the block of data at the requester from an owner node, if the owner node has an exclusive cached copy of the block of data, and from the home node, if no exclusive cached copy of the block of data exists when the home node receives the first request.

29. The method of claim 28, further comprising issuing a third request for the block data from the home node to the owner node in response to determining that the owner node has the exclusive cached copy of the requested data.

30. The method of claim 29, further comprising providing the coherent copy of the requested data in response to the second request when the owner node receives the second request prior to the third request.

31. The method of claim 29, further comprising providing the coherent copy of the requested data in response to the third request when the owner node receives the third request prior to the second request.

32. A method comprising:

issuing a first request for a block of data from a requester to a home node;

concurrently issuing a second request for the block of data from the requester to a predicted node based on the first request;

receiving at least one coherent copy of the block of data at the requester from an owner node, if the owner node has an exclusive cached copy of the block of data, and from the home node, if no exclusive cached copy of the block of data exists when the home node receives the first request;

issuing a third request for the block data from the home node to the owner node in response to determining that the owner node has the exclusive cached copy of the requested data; and employing a cache coherency protocol wherein the first request is provided in a request channel, the second and third requests are each provided in a forward channel, the coherent copy of the block of data is returned to the requester in a response channel, and wherein requests for the requested data in the forward channel do not block.

33. The method of claim 28, further comprising:

providing a response that includes the coherent copy of the requested data from the owner node to the requester in response to the second request; and sending a corresponding victim acknowledgement message from the owner node to the home node in response to the second request.

* * * * *

UNITED STATES PATENT AND TRADEMARK OFFICE
CERTIFICATE OF CORRECTION

PATENT NO. : 7,240,165 B2
APPLICATION NO. : 10/758473
DATED : July 3, 2007
INVENTOR(S) : Gregory Edward Tierney et al.

It is certified that error appears in the above-identified patent and that said Letters Patent is hereby corrected as shown below:

In column 27, line 55, in Claim 17, delete "cohere icy" and insert -- coherency --, therefor.

Signed and Sealed this

Fifth Day of August, 2008

JON W. DUDAS
*Director of the United States Patent and Trademark Office*